United States Patent
Jubner et al.

(10) Patent No.: US 11,859,961 B2
(45) Date of Patent: Jan. 2, 2024

(54) OPTICS FOR VEHICLE OCCUPANT MONITORING SYSTEMS

(71) Applicant: Neonode Inc., San Jose, CA (US)

(72) Inventors: Björn Alexander Jubner, Spånga (SE); Lars Bertil Sparf, Vällingby (SE); Robert Sven Pettersson, Huddinge (SE); Hans Anders Jansson, Älta (SE)

(73) Assignee: Neonode Inc., San Jose, CA (US)

( * ) Notice: Subject to any disclaimer, the term of this patent is extended or adjusted under 35 U.S.C. 154(b) by 791 days.

(21) Appl. No.: 16/963,836

(22) PCT Filed: Jan. 23, 2019

(86) PCT No.: PCT/US2019/014667
§ 371 (c)(1),
(2) Date: Jul. 22, 2020

(87) PCT Pub. No.: WO2019/147612
PCT Pub. Date: Aug. 1, 2019

(65) Prior Publication Data
US 2021/0056341 A1    Feb. 25, 2021

Related U.S. Application Data

(60) Provisional application No. 62/621,644, filed on Jan. 25, 2018.

(51) Int. Cl.
*G01B 11/02* (2006.01)
*B60R 21/015* (2006.01)
(Continued)

(52) U.S. Cl.
CPC .......... *G01B 11/026* (2013.01); *B60R 21/013* (2013.01); *B60R 21/01538* (2014.10);
(Continued)

(58) Field of Classification Search
CPC .......... B60K 2370/179; B60K 2370/48; B60R 21/013; B60R 21/01538; B60R 21/01552;
(Continued)

(56) References Cited

U.S. PATENT DOCUMENTS 4,710,760 A   12/1987 Kasday
4,782,328 A   11/1988 Denlinger
(Continued)

FOREIGN PATENT DOCUMENTS

JP    7-128013 A    5/1995
JP    2004522148   *  7/2004
(Continued)

OTHER PUBLICATIONS

European Patent Application No. 19 744 199.1, Extended European Search Report, dated Sep. 21, 2021, 5 pages.
(Continued)

*Primary Examiner* — Peter B Kim
(74) *Attorney, Agent, or Firm* — Soquel Group LLC

(57) ABSTRACT

A focusing optical part, including a plastic body, suitable for being delivered on a tape and reel and mounted on a PCB by an automated mounting machine, the plastic body including a concave mirror including a center aperture input surface through which light enters the plastic body, a convex mirror opposite the center aperture, wherein the concave mirror and the convex mirror form a reflective objective that reflects and focuses the light inside the plastic body, and an exit surface surrounding the convex mirror, through which focused light exits the plastic body.

19 Claims, 20 Drawing Sheets

(51) Int. Cl.
| | |
|---|---|
| *B60R 21/013* | (2006.01) |
| *G01S 7/481* | (2006.01) |
| *G01S 17/42* | (2006.01) |
| *G02B 17/06* | (2006.01) |
| *G02B 27/00* | (2006.01) |
| *G02B 17/00* | (2006.01) |
| *G06V 20/58* | (2022.01) |
| *G06V 20/59* | (2022.01) |
| *H04N 23/54* | (2023.01) |
| *H04N 23/55* | (2023.01) |

(52) U.S. Cl.
CPC ...... *B60R 21/01552* (2014.10); *G01S 7/4816* (2013.01); *G01S 17/42* (2013.01); *G02B 17/006* (2013.01); *G02B 17/0631* (2013.01); *G02B 27/0093* (2013.01); *G06V 20/58* (2022.01); *G06V 20/593* (2022.01); *G06V 20/597* (2022.01); *H04N 23/54* (2023.01); *H04N 23/55* (2023.01)

(58) Field of Classification Search
CPC ....... G01B 11/026; G01B 11/26; G01S 17/42; G01S 17/48; G01S 17/88; G01S 7/4816; G02B 13/0065; G02B 17/006; G02B 17/0631; G02B 19/0076; G02B 2003/0093; G02B 27/0093; H04N 23/54; H04N 23/55; G06F 3/017; G06F 3/0304; G06F 3/038; G06F 3/0421; G06V 20/58; G06V 20/593; G06V 20/597
See application file for complete search history.

(56) References Cited

U.S. PATENT DOCUMENTS

| | | |
|---|---|---|
| 6,208,330 B1 | 3/2001 | Hasegawa et al. |
| 6,947,032 B2 | 9/2005 | Morrison et al. |
| 7,232,986 B2 | 6/2007 | Worthington et al. |
| 7,302,156 B1 | 11/2007 | Lieberman et al. |
| 7,492,357 B2 | 2/2009 | Morrison |
| 7,781,722 B2 | 8/2010 | Lieberman |
| 8,780,087 B2 | 7/2014 | Kim |
| 2002/0153488 A1 | 10/2002 | Utukuri et al. |
| 2005/0077452 A1 | 4/2005 | Morrison et al. |
| 2007/0165007 A1 | 7/2007 | Morrison et al. |
| 2008/0010616 A1 | 1/2008 | Algreatly |
| 2008/0259310 A1 | 10/2008 | Wada |
| 2009/0058833 A1 | 3/2009 | Newton |
| 2010/0045629 A1 | 2/2010 | Newton |
| 2010/0201637 A1 | 8/2010 | Herne et al. |
| 2010/0214214 A1 | 8/2010 | Corson et al. |
| 2010/0271331 A1 | 10/2010 | Alameh et al. |
| 2011/0133941 A1 | 6/2011 | Yao et al. |
| 2011/0170088 A1 | 7/2011 | Utukuri et al. |
| 2014/0118819 A1 | 5/2014 | Sanson |
| 2014/0364218 A1 | 12/2014 | Holmgren et al. |
| 2017/0219694 A1 | 8/2017 | Send et al. |
| 2021/0356232 A1* | 11/2021 | Davenel ............... F41G 7/2253 |

FOREIGN PATENT DOCUMENTS

| | | | |
|---|---|---|---|
| JP | 2019506998 | * | 3/2019 |
| WO | 2013138003 A1 | | 9/2013 |

OTHER PUBLICATIONS

Achar, S. et al., "Epipolar Time-of-Flight Imaging," ACM Transactions on Graphics, vol. 36, No. 4, Article 37, Jul. 2017, 8 pp.
Wikipedia "F-Number," Jan. 3, 2018, Retrieved from https://en.wikipedia.org/wiki/F-number on Apr. 10, 2019, 6 pp.
PCT International Search Report and Written Opinion for Application No. PCT/US2019/014667, dated Jun. 6, 2019, 12 pp.

* cited by examiner

OPTICS FOR VEHICLE OCCUPANT MONITORING SYSTEMS

CROSS-REFERENCE TO RELATED APPLICATIONS

This application claims benefit under 35 U.S.C. § 371 of PCT Application No. PCT/US2019/014667 entitled POLAR COORDINATE SENSOR, filed on Jan. 23, 2019 by inventors Alexander Jubner, Lars Bertil Sparf, Robert Sven Pettersson and Stefan Johannes Holmgren. PCT Application No. PCT/US2019/014667 claims priority of U.S. Provisional Patent Application No. 62/621,644, filed on Jan. 25, 2018 by inventors Alexander Jubner, Lars Bertil Sparf, Robert Sven Pettersson and Stefan Johannes Holmgren.

FIELD OF THE INVENTION

The field of the present invention is environmental mapping and surveying by identifying the position and contour of objects on a plane or in space using light reflections. Applications include touch screen sensors, gesture sensors, 3D scanning to create three-dimensional models, object detection in collision avoidance systems for vehicles and drones, and vehicle occupant monitoring.

BACKGROUND OF THE INVENTION

Prior art reflectance-based sensors are discussed in U.S. Pat. No. 9,164,625, entitled PROXIMITY SENSOR FOR DETERMINING TWO-DIMENSIONAL COORDINATES OF A PROXIMAL OBJECT. These prior art sensors are positioned along an edge of a detection zone, and therefore the length of the sensor should match the length of the edge along which it is placed. It would be advantageous to provide a single sensor component suitable for a large range of detection area dimensions.

Prior art camera-based 3D sensors bend image data for further analysis and thus involve large amounts of data traffic and processing resources. It would be advantageous to reduce data traffic and external processing requirements in touch and gesture sensing, 3D scanning and environmental mapping applications.

In the polar coordinate system, a point is chosen as the pole and a ray from this point is taken as the polar axis. For a given angle θ, there is a single line through the pole whose angle with the polar axis is θ (measured counterclockwise from the axis to the line). Then there is a unique point on this line whose signed distance from the origin is r for given number r. For a given pair of coordinates (r, θ) there is a single point. There are two common methods for extending the polar coordinate system to three dimensions. In the cylindrical coordinate system, a z-coordinate with the same meaning as in Cartesian coordinates is added to the r and θ polar coordinates giving a triple (r, θ, z). Spherical coordinates take this a step further by converting the pair of cylindrical coordinates (r, z) to polar coordinates (ρ, φ) giving a triple (ρ, θ, φ). (Source: https://en.m.wikipedia.org/wiki/Coordinate_system)

SUMMARY

There is thus provided in accordance with an embodiment of the present invention a polar coordinate sensor including a circuit board, at least one light emitter mounted on the circuit board, each light emitter operable when activated to project light across a detection zone, an array of light detectors mounted on the circuit board, each light detector, denoted $PD_i$, operable when activated to output a measure of an amount of light arriving at that light detector, a lens positioned in relation to the array, such that each light detector $PD_i$ has a corresponding angle of incidence, denoted $θ_i$, from among a plurality of different angles θ, at which when light enters the lens at angle $θ_i$ more light arrives at light detector $PD_i$ than at any of the other light detectors, and a processor connected to the at least one light emitter and to the array, operable to activate light detectors in the array synchronously with the at least one light emitter, the processor being configured to determine a polar angle, θ, of a reflective object within the detection zone relative to the lens, based on the location within the array of the light detector $PD_i$ that detects the greatest amount of the object's reflection.

According to features in embodiments of the invention, the polar coordinate sensor processor is configured to determine the polar angle, θ, of the reflective object within the detection zone relative to the lens, by interpolating the outputs of those light detectors in the neighborhood of the light detector $PD_i$ that detects the greatest amount of the object's reflection.

According to features in embodiments of the invention, the polar coordinate sensor lens is positioned in relation to the array, such that the fields of view of adjacent detectors in the array overlap.

According to features in embodiments of the invention, the polar coordinate sensor processor activates a plurality of the detectors concurrently.

According to features in embodiments of the invention, the polar coordinate sensor light emitter includes a plurality of light emitters, each projecting light across a different segment of the detection zone.

According to features in embodiments of the invention, the polar coordinate sensor processor activates only those emitters that project light across segments of the detection zone in which a previously detected object is expected to be located.

According to features in embodiments of the invention, the polar coordinate sensor processor activates only those detectors $PD_i$ whose respective angles $θ_i$ correspond to segments of the detection zone in which a previously detected object is expected to be located.

According to features in embodiments of the invention, the polar coordinate sensor array of detectors is mounted on the circuit board along a curve.

According to features in embodiments of the invention, the polar coordinate sensor detection zone surrounds the sensor.

According to features in embodiments of the invention, the polar coordinate sensor processor further measures elapsed time of flight for photons reflected by the object and detected by the light detectors and calculates a radial coordinate of the object based on the measured time.

There is additionally provided in accordance with an embodiment of the present invention a triangulating sensor including a plurality of any of the polar coordinate sensors discussed hereinabove, arranged along a perimeter of a detection zone and directed toward the detection zone, each polar coordinate sensor determining at least one polar angle of a reflective object within the detection zone, and a calculating unit, coupled with the polar coordinate sensors, configured to determine the location of the object by triangulating the polar angles determined by the polar coordinate sensors.

According to features in embodiments of the invention, the plurality of polar coordinate sensors is arranged along the perimeter of the detection zone such that for any location in the detection zone, at least one of the polar angles has significant sensitivity to displacement of the object near that location, so as to accurately triangulate that location.

According to features in embodiments of the invention, the calculating unit is configured to further determine the object location by comparing respective cumulative outputs of the arrays of light detectors of the polar coordinate sensors.

According to features in embodiments of the invention, at least three polar coordinate sensors send polar angles to the calculating unit for the triangulating.

There is further provided in accordance with an embodiment of the present invention a spherical coordinate sensor including a circuit board, at least one light emitter mounted on the circuit board, each light emitter operable when activated to project light across a detection zone, a two-dimensional array of light detectors mounted on the circuit board, each light detector, denoted $PD_{ij}$, operable when activated to output a measure of an amount of light arriving at that light detector, a lens positioned in relation to the array, such that each light detector $PD_{ij}$ has corresponding polar and azimuth angles of incidence, denoted $(\theta_i, \varphi_j)$, from among a plurality of different polar and azimuth angle combinations $(\theta, \varphi)$, at which when light enters the lens at polar and azimuth angles $(\theta_i, \varphi_j)$ more light arrives at light detector $PD_{ij}$ than at any of the other light detectors, and a processor connected to the at least one light emitter and to the light detectors, operable to activate the light detectors synchronously with the at least one light emitter, the processor being configured to determine a polar angle, $\theta$, and an azimuth angle $\varphi$, of a reflective object within the detection zone relative to the lens, based on the location within the array of the light detector $PD_{ij}$ that detects the greatest amount of the object's reflection.

According to features in embodiments of the invention, the spherical coordinate sensor processor is configured to determine the polar and azimuth angles $(\theta, \varphi)$, of the reflective object within the detection zone relative to the lens, by interpolating the outputs of those light detectors in the neighborhood of the light detector $PD_{ij}$ that detects the greatest amount of the object's reflection.

According to features in embodiments of the invention, the spherical coordinate sensor lens is positioned in relation to the array, such that the fields of view of adjacent detectors in the array overlap.

According to features in embodiments of the invention, the spherical coordinate sensor processor activates a plurality of the detectors concurrently.

According to features in embodiments of the invention, the spherical coordinate sensor light emitter includes a plurality of light emitters, each projecting light across a different segment of the detection zone.

According to features in embodiments of the invention, the spherical coordinate sensor processor activates only those emitters that project light across segments of the detection zone in which a previously detected object is expected to be located.

According to features in embodiments of the invention, the spherical coordinate sensor processor activates only those detectors $PD_{ij}$ whose respective angles $(\theta_i, \varphi_j)$ correspond to segments of the detection zone in which a previously detected object is expected to be located.

According to features in embodiments of the invention, the spherical coordinate sensor detection zone surrounds the sensor.

According to features in embodiments of the invention, the spherical coordinate sensor processor further measures elapsed time of flight for photons reflected by the object and detected by the light detectors and calculates a radial coordinate of the object based on the measured time.

There is further provided in accordance with an embodiment of the present invention a focusing optical part, including a plastic body, characterized in that it is suitable for being delivered on a tape and reel and mounted on a PCB by an automated mounting machine, including an input surface through which light enters the plastic body, and an exit surface through which focused light exits the plastic body, and a reflective objective, reflecting and focusing the light inside the plastic body.

According to features in embodiments of the invention, the focusing optical part exit surface is concave and formed to minimize refraction of the focused light.

According to features in embodiments of the invention, reflections by the reflective objective cause a portion of the light that enters the part to exit the part through the input surface, and wherein the input surface is concave and formed to refract incoming light in a manner that minimizes the amount of light that exits through the input surface.

According to features in embodiments of the invention, the focusing optical part has an f-number less than 1.

According to features in embodiments of the invention, the focusing optical part has an f-number less than 0.8.

According to features in embodiments of the invention, the focusing optical part has a field of view of +/−20 degrees.

There is still further provided in accordance with an embodiment of the present invention a spherical coordinate sensor including a circuit board, at least one light emitter mounted on the circuit board, each light emitter operable when activated to project light across a detection zone, the focusing optical part described hereinabove mounted on the circuit board and receiving light from the detection zone, a camera including a plurality of pixel sensors, mounted on the circuit board beneath the focusing optical part such that when the received light enters the focusing optical part at a three-dimensional angle of incidence, comprising a polar angle and an azimuth angle, denoted $(\theta_i, \varphi_j)$, more light arrives at a respective camera pixel sensor than at any of the other camera pixel sensors, and a processor connected to the at least one light emitter and to the camera, the processor being configured to determine a polar angle, $\theta$, and an azimuth angle, $\varphi$, of a reflective object within the detection zone relative to the focusing optical part, based on the camera pixel sensor that detects the greatest amount of the object's reflection.

According to features in embodiments of the invention, the spherical coordinate sensor processor is configured to determine the angles $\theta$, $\varphi$ of the reflective object within the detection zone relative to the focusing optical part, by interpolating the outputs of a neighborhood of the camera pixel sensors that detects the greatest amount of the object's reflection.

According to features in embodiments of the invention, the spherical coordinate sensor processor measures elapsed time of flight for photons reflected by the object and detected by the camera, calculates a distance between the camera and the object based on the measured time, and determines a location of the reflective object within the detection zone based on the angles $\theta$, $\varphi$ and the calculated distance.

There is still further provided in accordance with an embodiment of the present invention a triangulating sensor including a plurality of the spherical coordinate sensors described hereinabove, arranged in a manner that their respective detection zones overlap, and a calculating unit receiving the angles θ, φ calculated by the different spherical coordinate sensors and configured to determine a location of a reflective object within the overlapping detection zones by triangulating the received angles.

There is also provided in accordance with an embodiment of the present invention a vehicle occupant behavior monitor including at least one spherical coordinate sensor described hereinabove mounted in a vehicle in a manner that an occupant of the vehicle is at least partially inside the spherical coordinate sensor detection zone, the spherical coordinate sensor mapping contiguous coordinates of the occupant's body, a calculating unit receiving the mapped coordinates and corresponding images of the occupant captured by the camera in the spherical coordinate sensor, and configured to monitor occupant behavior based on the mapped coordinates and corresponding images.

There is additionally provided in accordance with an embodiment of the present invention a method for monitoring vehicle occupant behavior, including receiving spherical coordinates that map contiguous coordinates of a vehicle occupant's body, receiving camera images of the occupant captured at the time that the spherical coordinates are mapped, extracting coordinates of the vehicle occupant's body from the camera images, modifying the extracted coordinates based on the mapped spherical coordinates, and determining occupant behavior based on the modified coordinates.

BRIEF DESCRIPTION OF THE DRAWINGS

The present invention will be more fully understood and appreciated from the following detailed description, taken in conjunction with the drawings in which.

The following table catalogs the numbered elements and lists the figures in which each numbered element appears. Similarly numbered elements represent elements of the same type, but they need not be identical elements.

Figure 1:
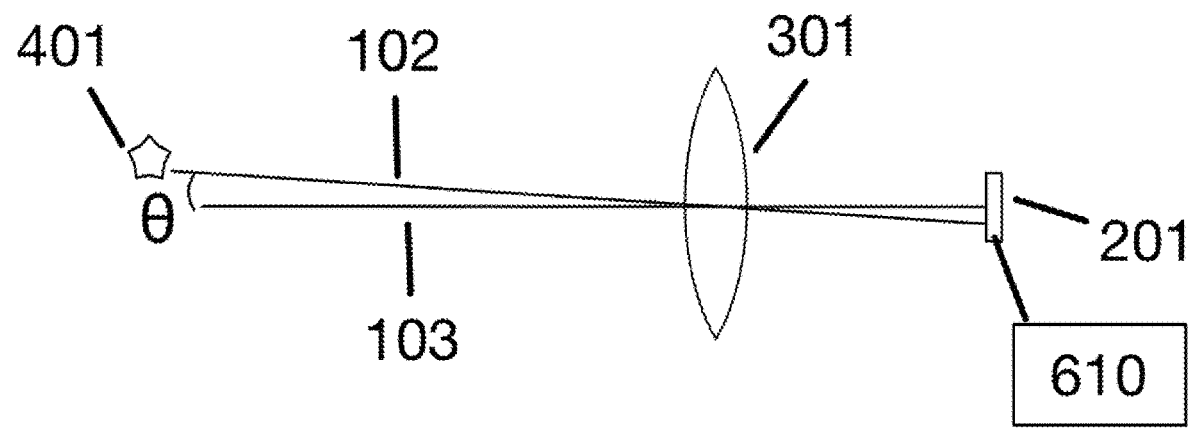
FIG. 1 is a simplified illustration of an object detected by a sensor, in accordance with an embodiment of the present invention.

| Numbered Elements | | |
| --- | --- | --- |
| Element | Description | FIGS. |
| 102, 104, 105, 106, 107, 109-128, 150-153 | object reflection | 1, 2, 3, 4, 5, 16, 17, 19-25 |
| 103 | optical axis | 1 |
| 140-148 | illuminated portion | 26, 27 |
| 160-163 | light image | 17 |
| 201-203, 206 | PD array | 1, 2, 3, 5, 6, 7, 10 |
| 204, 205 | PD | 3, 4 |
| 301-304 | lens | 1-10 |
| 311 | entry cavity | 11, 12, 14, 15 |
| 312 | entry surface | 11, 14, 15 |
| 313 | exit surface | 13, 14, 15 |
| 314 | convex mirror | 13, 14, 15 |
| 315 | concave mirror | 14, 15, 16 |
| 401-403 | object | 1, 2, 3, 19-23, 25 |
| 501-506 | polar coordinate sensor | 19-27 |
| 510 | focusing optical part featuring a reflective objective | 11-16 |
| 511 | camera sensor | 13-17 |
| 601 | display | 19-23 |
| 602 | shape of touch sensitive surface | 24 |
| 603 | detection zone | 25, 27 |
| 604 | detection zone perimeter | 25, 27 |
| 606 | calculating unit | 2, 19-23 |
| 607, 608 | arrows (indicate movement) | 20 |
| 609 | PCB | 5, 7 |
| 610, 611 | processor | 1-3 |

DETAILED DESCRIPTION

The present invention relates to reflection-based sensors having a 2D detection zone shaped as a wedge or circle, or a 3D detection zone shaped as a cone or sphere. The sensor is situated at a vertex of the wedge or cone and at the center of the circle or sphere. Sensors having a 2D detection zone detect the polar angle of an object within the detection zone and are referred to as polar coordinate sensors, and sensors having a 3D detection zone detect the polar angle and azimuth angle of the object in the detection zone and are referred to as spherical coordinate sensors. In some embodiments of the invention, two or more sensors are arranged to have overlapping detection zones and the location of detected objects is obtained by triangulating the polar angles and azimuth angles returned by different sensors. In other embodiments of the invention, each sensor includes apparatus for determining time of flight for photons reflected by the object. Therefore, in addition to determining the polar and azimuth angles, the polar and spherical coordinate sensors also calculate a radial distance between the object and the sensor based on the time of flight. The polar angle together with the radial distance calculated by one polar coordinate sensor is sufficient to determine the object location within a 2D detection zone, and polar and azimuth angles together with the radial distance calculated by one spherical coordinate sensor is sufficient to determine the object location within a 3D detection zone.

In some embodiments of the invention, a polar or spherical coordinate sensor includes an array of light detectors, which is a term that includes, inter alia, CMOS and CCD camera sensors and arrays of photodiodes. In some embodiments of the invention, the sensor further includes a lens that directs object reflections onto the array of light detectors. In some embodiments of the invention, the sensor also includes light emitters that illuminate the detection zone in order to generate object reflections.

Reference is made to FIG. 1, which is a simplified illustration of an object detected by a polar coordinate sensor, in accordance with an embodiment of the present invention. Object 401 is in an illuminated environment and produces reflections 102 that are directed by lens 301 and detected by array 201. Array 201 includes multiple light detecting elements such as PDs, and processor 610, connected to array 201, identifies the elements within the array that detect maximal reflection and determines the polar angle θ therefrom. Line 103 in FIG. 1 is the optical axis of lens 301. In some embodiments of the invention, the polar coordinate sensor detects spherical coordinates, namely, the PDs in array 201 are arranged as a two-dimensional grid or any other configuration that provides sensitivity to both the polar and azimuth angles of incoming reflections. In this case, the sensor is referred to as a spherical coordinate sensor. In some embodiments of the invention, array 201 is a CCD or CMOS camera sensor.

Figure 2:
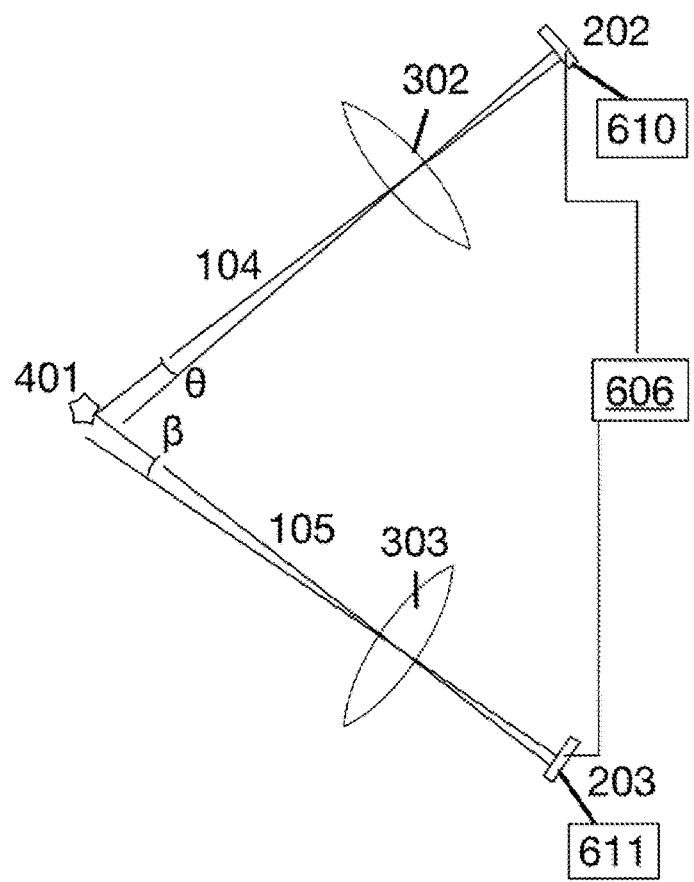
FIG. 2 is a simplified illustration of object reflections detected by two sensors, in accordance with an embodiment of the present invention.

Reference is made to FIG. 2, which is a simplified illustration of object reflections detected by two polar coordinate sensors, in accordance with an embodiment of the present invention. Specifically, a first polar coordinate sensor includes PD array 202, lens 302, and processor 610; and a second polar coordinate sensor includes PD array 203, lens 303 and processor 611. The first polar coordinate sensor detects object 401 by reflection 104, and the second polar coordinate sensor detects object 401 by reflection 105. Accordingly, the first polar coordinate sensor identifies object 401 at polar angle θ and the second polar coordinate sensor identifies object 401 at polar angle β. Calculating unit 606 triangulates these polar angles to determine a 2D location of object 401. When both polar coordinate sensors are configured to determine polar and azimuth angles of incoming reflections, calculating unit 606 triangulates these angles to determine a 3D location of object 401.

Figure 3:
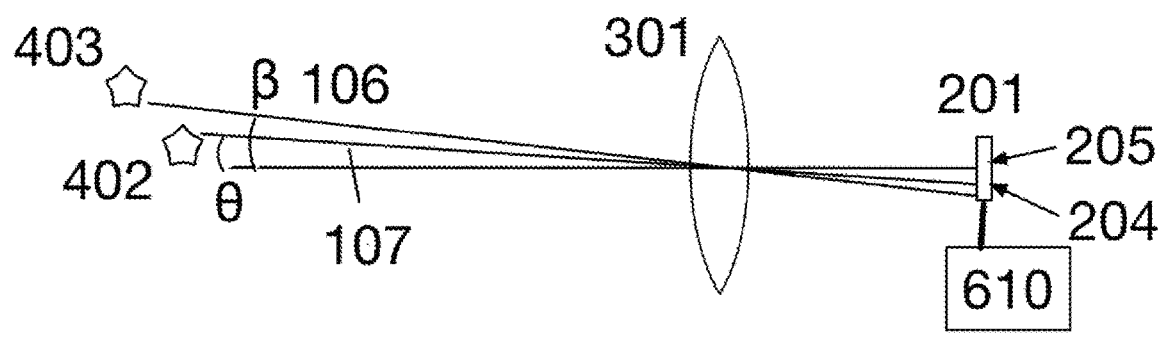
FIG. 3 is a simplified illustration of two objects detected by a sensor, in accordance with an embodiment of the present invention.

Reference is made to FIG. 3, which is a simplified illustration of two objects detected by a polar coordinate sensor, in accordance with an embodiment of the present invention. FIG. 3 shows two objects 402 and 403, at different locations, being detected by a polar coordinate sensor, and specifically by non-adjacent PDs 204 and 205 within PD array 201 that detect maximum reflections from these objects. Thus, multi-touch functionality is supported by the polar coordinate sensor of the present invention. In some embodiments of the invention, the polar coordinate sensor also measures time of flight for reflections 106 and 107, thereby enabling a single polar coordinate sensor to function as a touch and gesture detector by identifying the polar angle and radial distance of objects 402 and 403.

Figure 4:
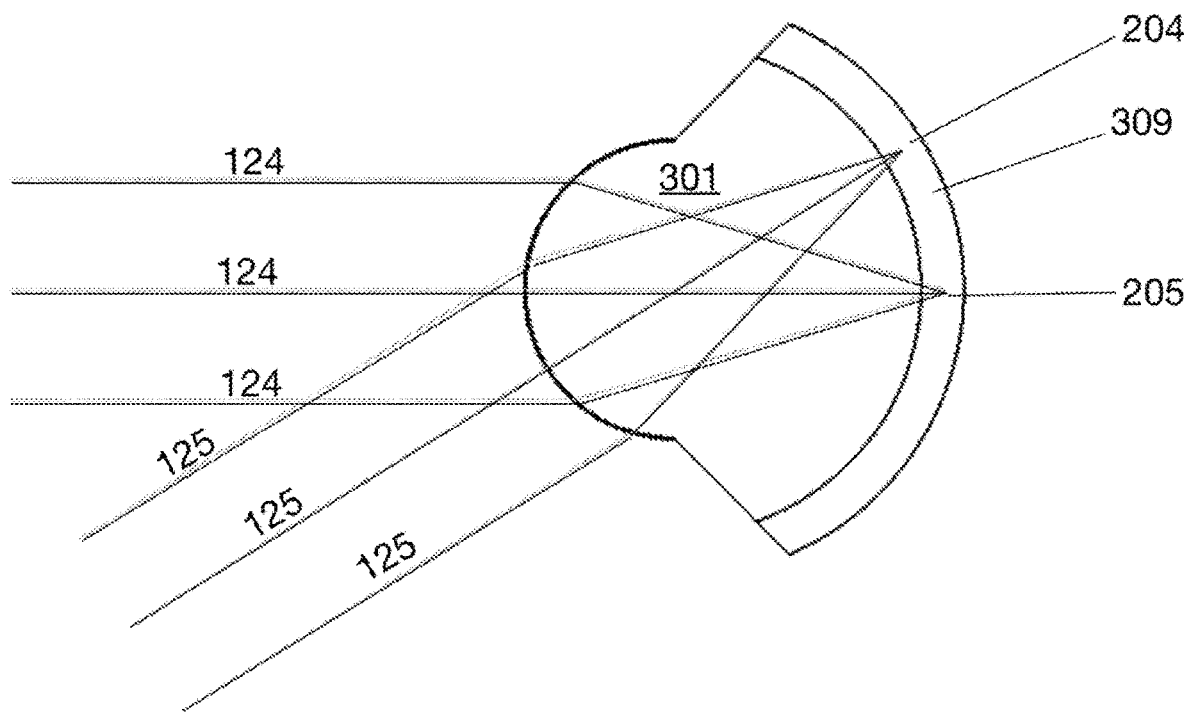
FIGS. 4 and 5 are top view and side view illustrations of a sensor receiving light from two objects, in accordance with an embodiment of the present invention.
Figure 5:
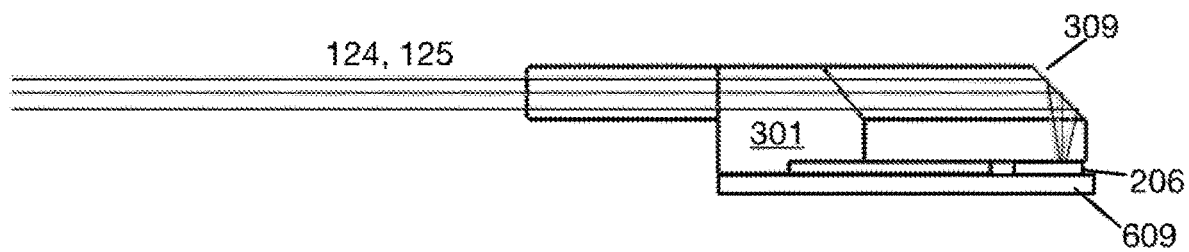

Reference is made to FIGS. 4 and 5, which are top view and side view illustrations of a polar coordinate sensor receiving light from two objects, in accordance with an embodiment of the present invention. FIG. 4 shows lens structure 301 directing two light objects 124 and 125 onto PDs 205 and 204, respectively, situated underneath reflective facet 309 of lens structure 301. Each light object 124 and 125 has a width, illustrated in FIG. 4 by three parallel beams of which the central beam represents the object's chief ray and the two outer beams represent the width of the light object.

FIG. 5 shows a side view of lens structure 301 of FIG. 4. FIG. 5 shows incoming light objects 124 and 125, PD array 206 and PCB 609 on which lens structure 301 and PD array 206 are mounted. FIG. 5 shows that the images of 124 and 125 are folded downward onto PD array 206 by internally reflective facet 309.

Figure 6:
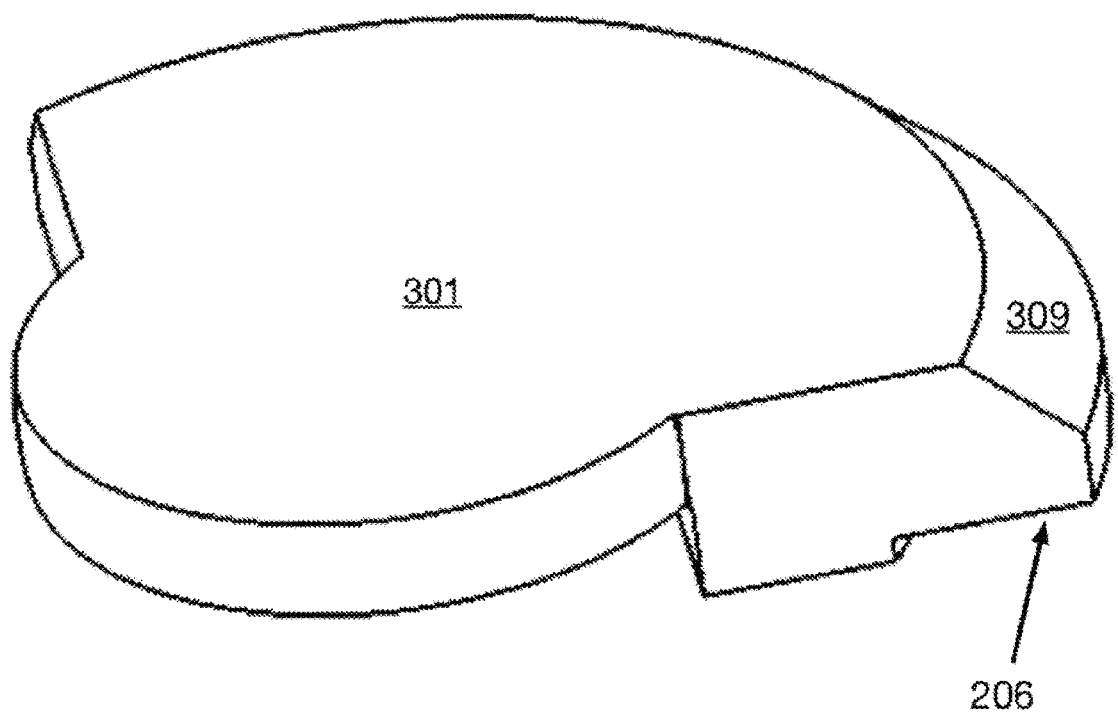
FIG. 6 is a perspective view of a lens structure used in the sensor of FIGS. 4 and 5, in accordance with an embodiment of the present invention.

Reference is made to FIG. 6, which is a perspective view of a lens structure used in the sensor of FIGS. 4 and 5, in accordance with an embodiment of the present invention. FIG. 6 shows a perspective view of lens structure 301, showing reflective facet 309 along the periphery and indicating PD array 206 situated underneath facet 309.

Figure 7:
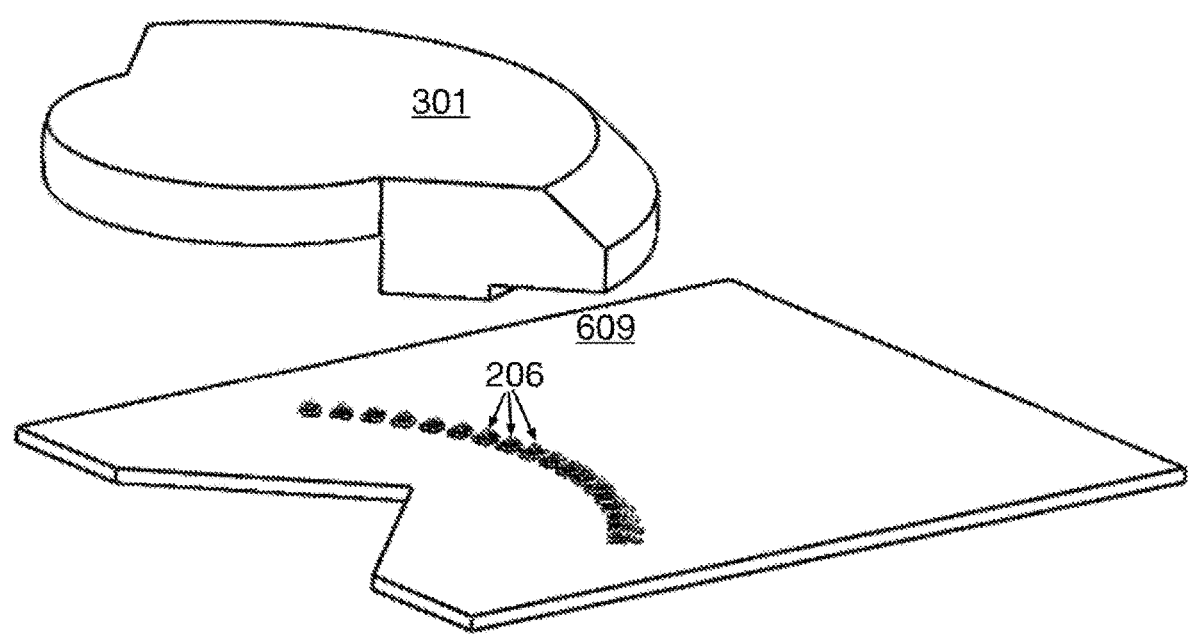
FIG. 7 is an exploded view of the sensor of FIGS. 4 and 5, in accordance with an embodiment of the present invention.

Reference is made to FIG. 7, which is an exploded view of the sensor of FIGS. 4 and 5, in accordance with an embodiment of the present invention. FIG. 7 shows an exploded view of lens structure 301 and its underlying PCB 609 with PD array 206 mounted thereon. In certain embodiments lens structure 301 is designed around two radii: a first radius of the lens input surface, and a second radius, larger than the first, along which PD array 206 is arranged, as explained hereinbelow.

Figure 8:
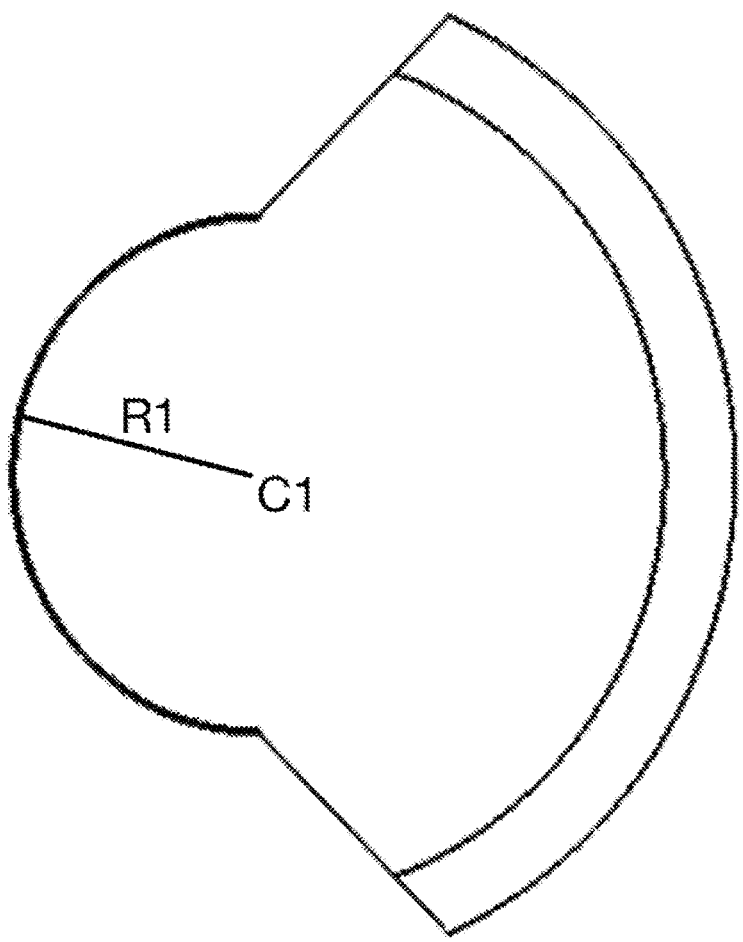
FIGS. 8-10 are illustrations of the geometry of the lens structure in FIGS. 4-7, in accordance with embodiments of the present invention.
Figure 9:
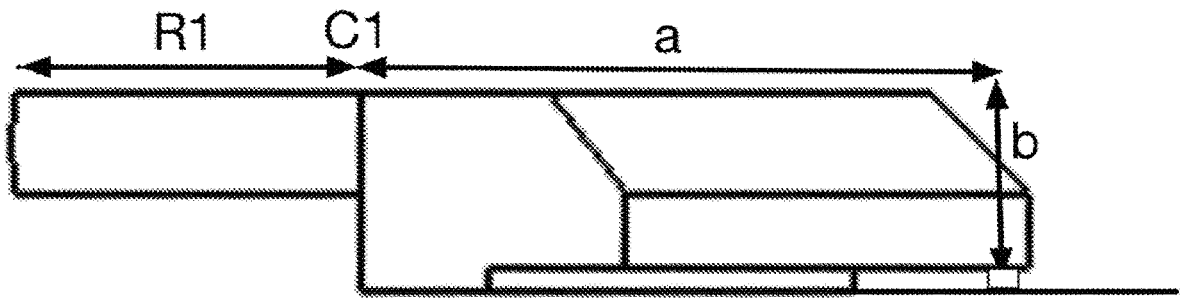
Figure 10:
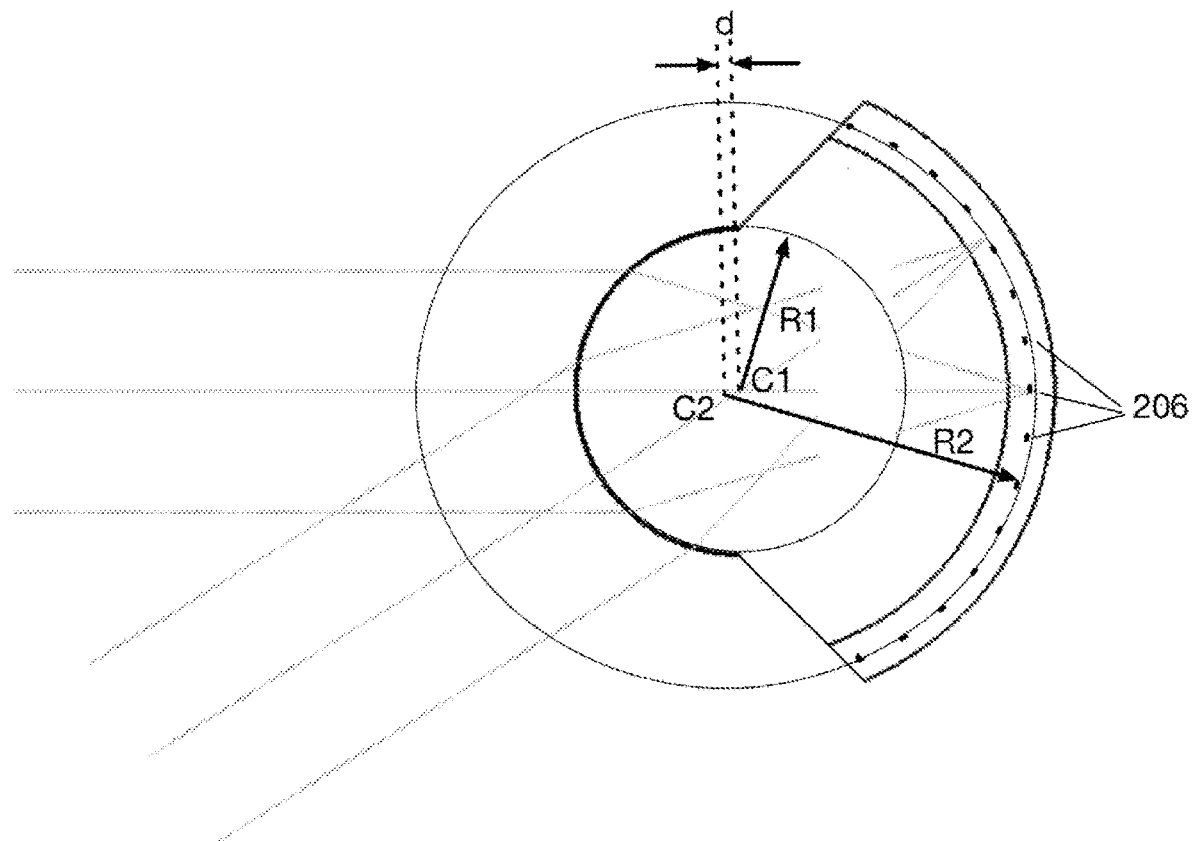

Reference is made to FIGS. 8-10, which are illustrations of the geometry of the lens structure in FIGS. 4-7, in accordance with embodiments of the present invention. FIG. 8 is a view from above of lens structure 301, showing radius R1 of the lens input surface. The focal point of the lens input surface is indicated as C1.

FIG. 9 is a side view of lens structure 301, showing radius R1 and focal point C1. The second radius, namely, that radius defining the arc along which PD array 206 is arranged, is the sum of a+b, which is the distance traveled by the light beams from the focal point C1 to array 206. Because height b in FIG. 9 is vertical, the rear portion of lens structure 301 is formed with a radius R2 whose center is shifted a distance b in front of C1. This is illustrated in FIG. 10.

FIG. 10 is a view from above of lens structure 301, showing radius R1 and focal point C1 of the lens input surface, and radius R2 along which PD array 206 is arranged. The center for radius R2 is shown as C2, which is shifted a distance d away from C1. d is equal to height b in FIG. 9. This enables PD array 206 to use the same focal point C1 as the input surface.

Figure 11:
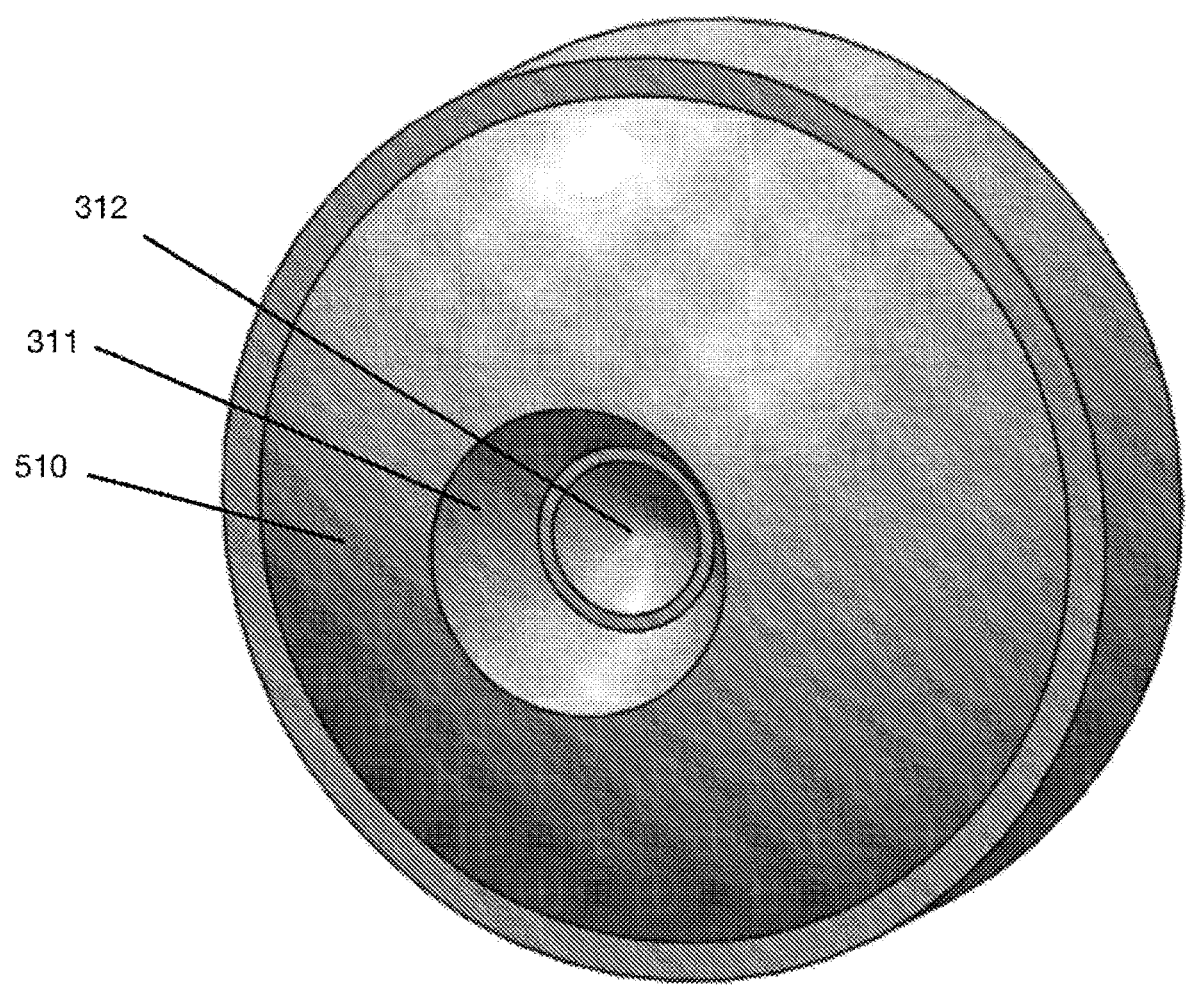
FIGS. 11-15 are different views of a focusing optical part, designed to be mounted above a camera sensor on a circuit board by an automated mounting machine, and featuring a reflective objective, in accordance with an embodiment of the present invention.
Figure 12:
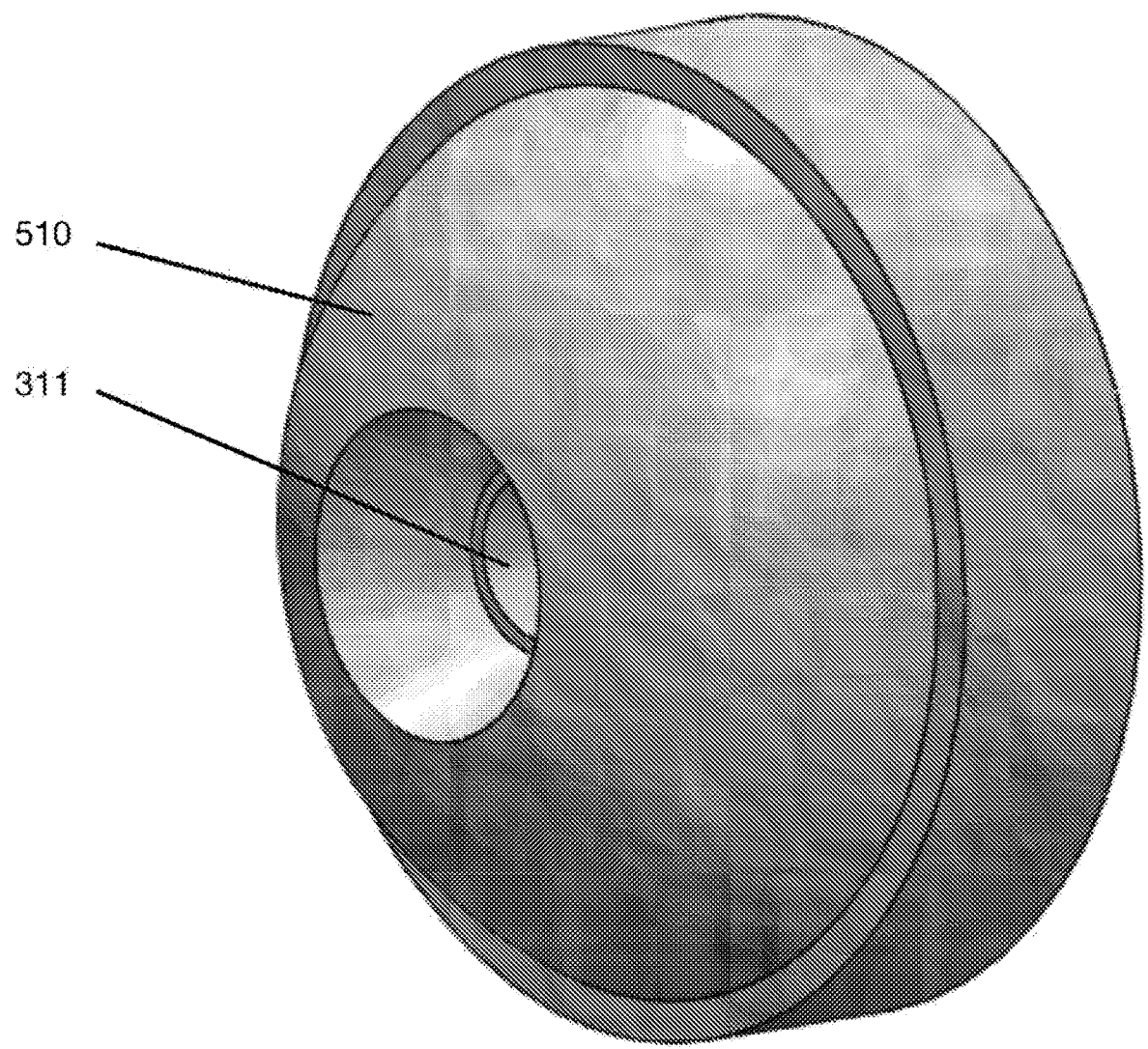
Figure 13:
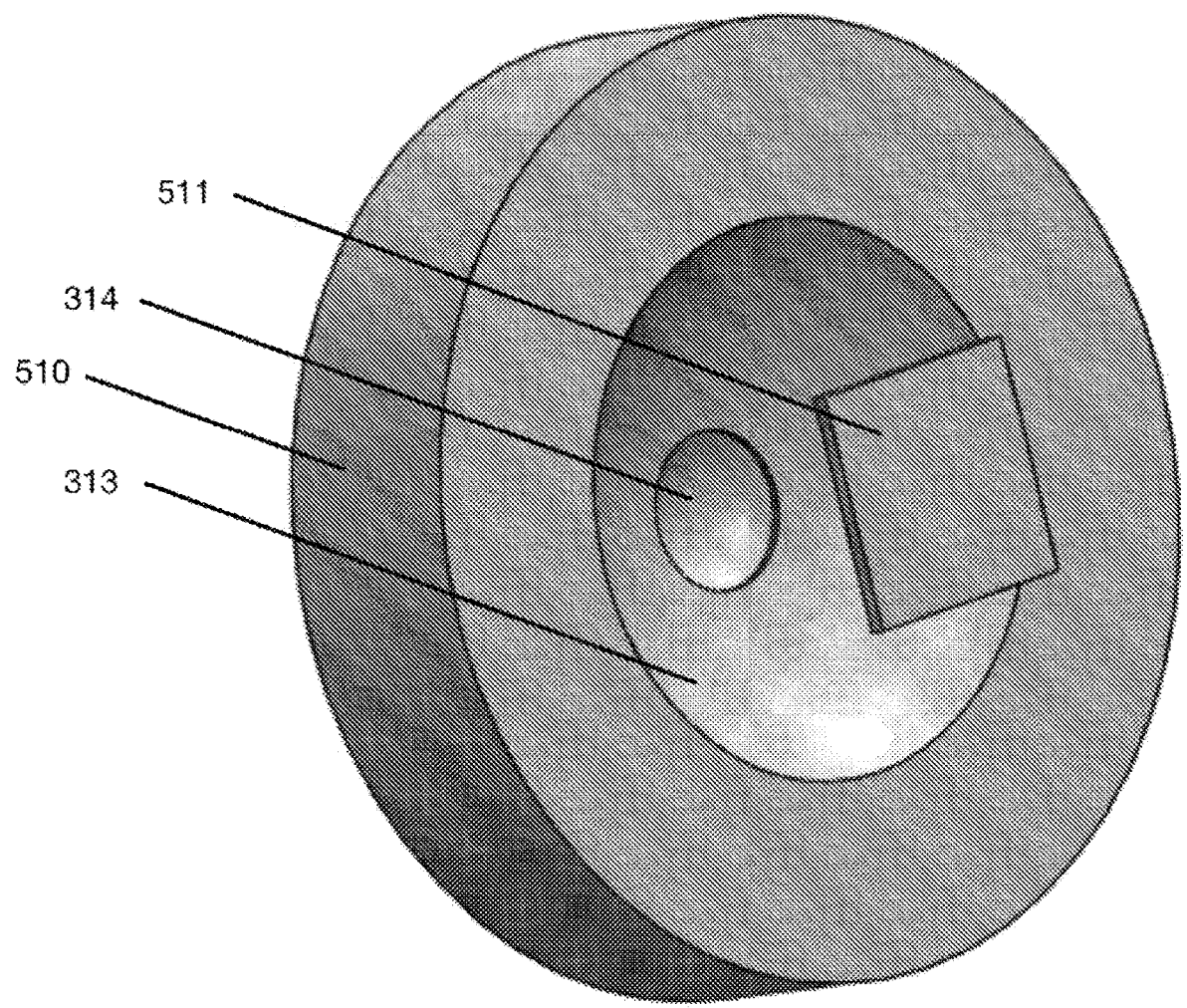

Reference is made to FIGS. 11-15, which are different views of a focusing optical part, designed to be mounted above a camera sensor on a circuit board by an automated mounting machine, and featuring a reflective objective, in accordance with an embodiment of the present invention. FIGS. 11-13 illustrate an alternative to the lens structure in FIGS. 4-10. FIGS. 11-13 are different perspective views of a focusing optical part 510 coupled with a camera sensor 511, in accordance with an embodiment of the present invention. The optical part includes a reflective objective, for example, a modified, two-mirror Schwarzschild objective.

In the prior art, reflective objectives are known to have an advantage over refracting lenses in terms of chromatic aberrations. Namely, whereas a refractive lens causes chromatic aberrations due to refraction, a reflective objective uses only mirrors. This enables creating an optical system without any refraction, and thus, without any chromatic aberrations, as long as the light reflected by the mirrors travels only through air. It would be counter-intuitive to design a reflective objective that passes light through multiple air-to-plastic interfaces, as these interfaces would refract the light causing chromatic aberrations which the reflective objective is typically designed to eliminate. However, it is difficult to build a reflective objective in a manner that the two mirrors will be suspended in air, yet characterized in that the part is suitable for being delivered on a tape and reel and mounted on a PCB by an automated mounting machine. Therefore, the present invention teaches a reflective objective formed as a single, solid optical part that can be delivered on a tape and reel and mounted on a PCB using automated mounting machinery.

FIGS. 11 and 12 are perspective views of focusing optical part 510 from the top, and FIG. 13 is a perspective view from the bottom. Light enters focusing optical part 510 from the top and exits from the bottom. The top of optical part 510 is dome-shaped, with a cavity or well 311 carved out of the center of the dome. The bottom of cavity 311 is a light-transmissive input surface 312 through which light enters focusing optical part 510. The light is reflected and focused inside focusing optical part 510, as explained hereinbelow, and the focused light exits through concave exit surface 313 onto camera sensor 511. At the top of exit surface 313 is a dome-shaped convex mirror 314 whose mirror surface faces entry surface 312.

Figure 14:
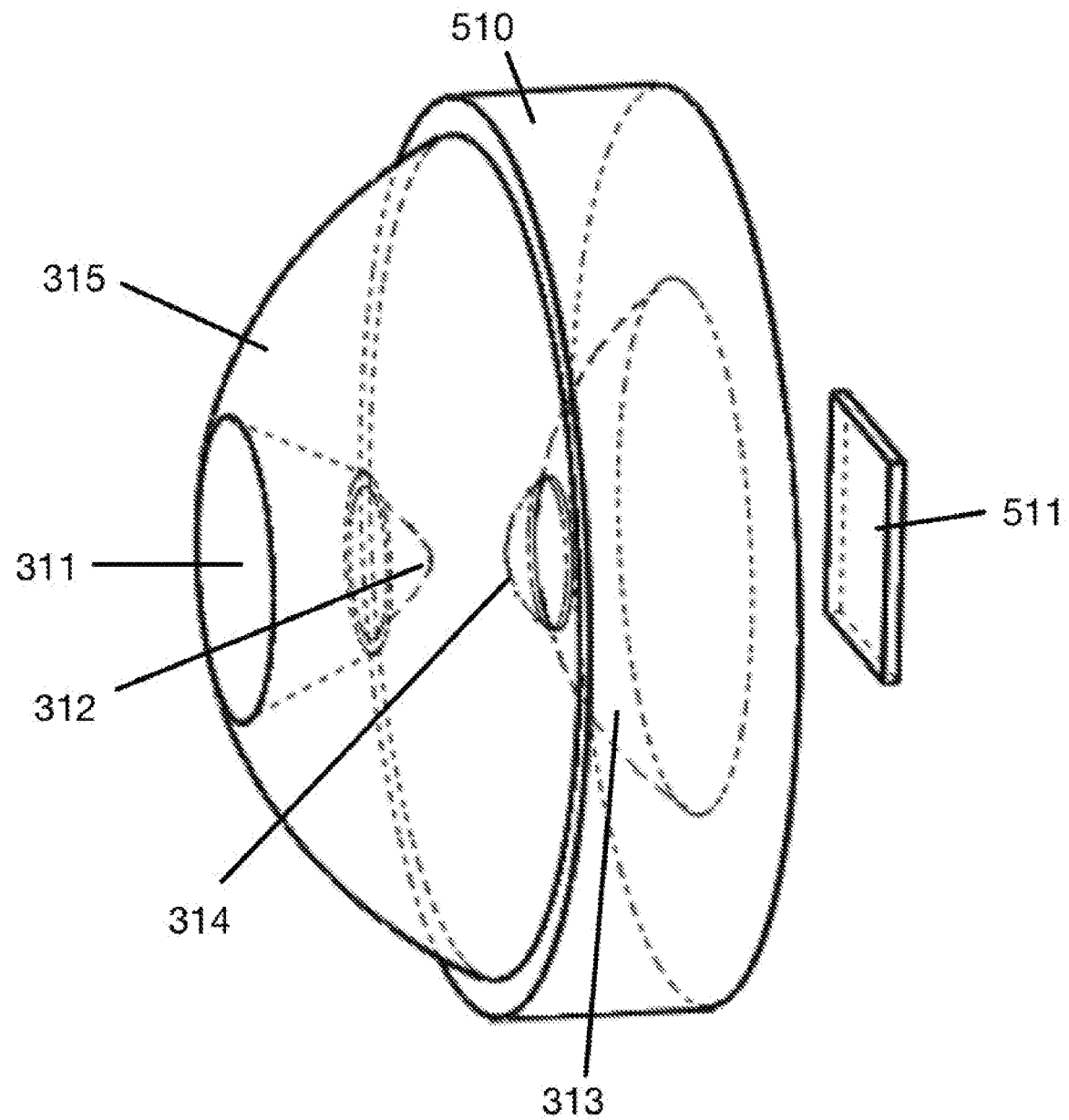

FIG. 14 is a wireframe perspective view of focusing optical part 510. Focusing optical part 510 is designed for a 0.3 mm×0.3 mm, 8×8 pixel camera sensor, shown in the figure as element 511. Focusing optical part 510 has a focal length of 0.4 mm and an f-number less than 0.8. FIG. 14 shows that the part has an upper dome, the interior of which is an upside-down bowl-shaped, concave mirror 315, and a lower, upside-down bowl-shaped, concave exit surface 313. At the top of the upper dome there is a hollow cavity or well 311, the bottom of which is entry surface 312. Opposite and underneath entry surface 312 is convex mirror 314.

Figure 15:
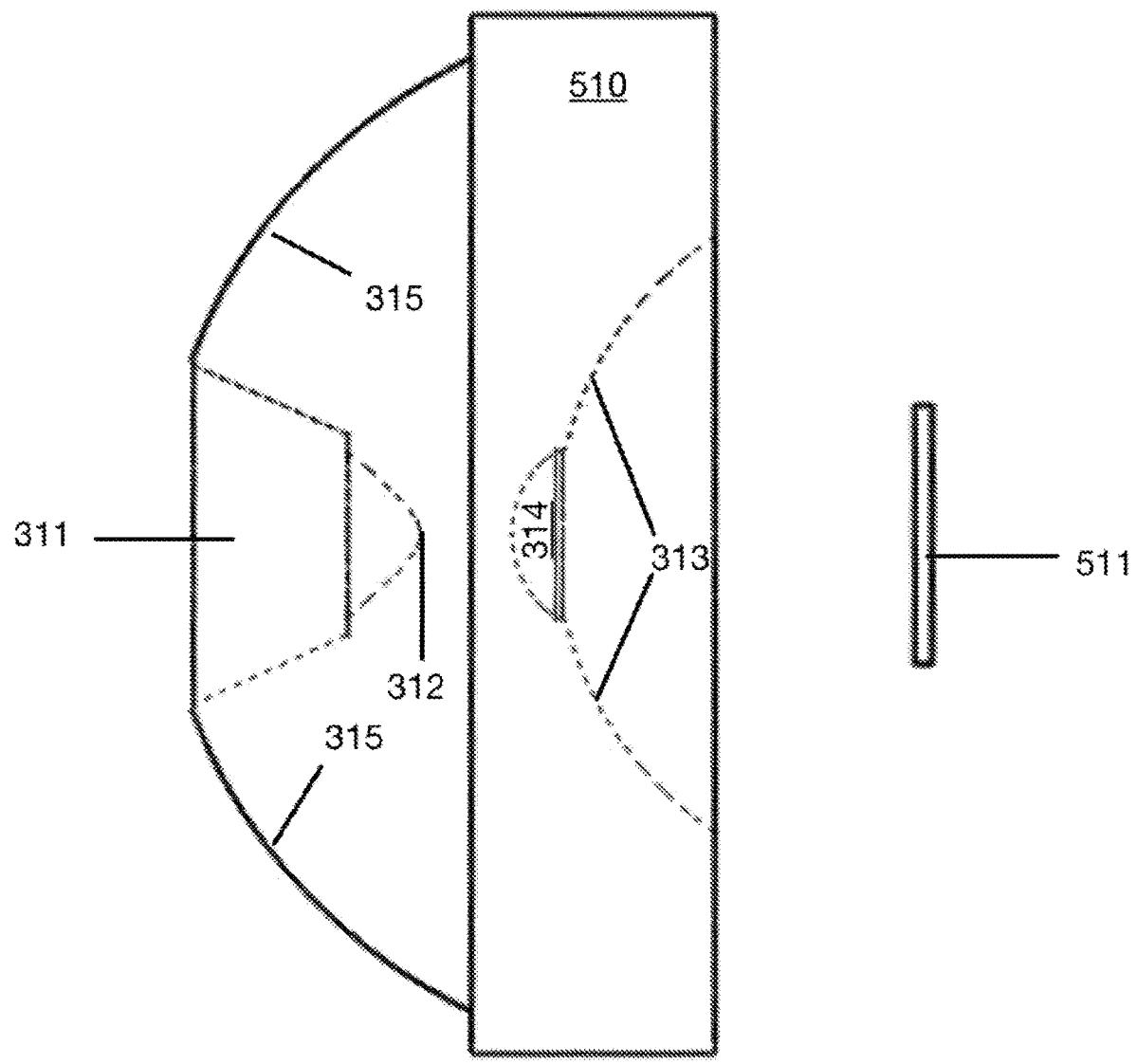

FIG. 15 shows a cross-section of focusing optical part 510 and sensor 511 of FIG. 14.

Figure 16:
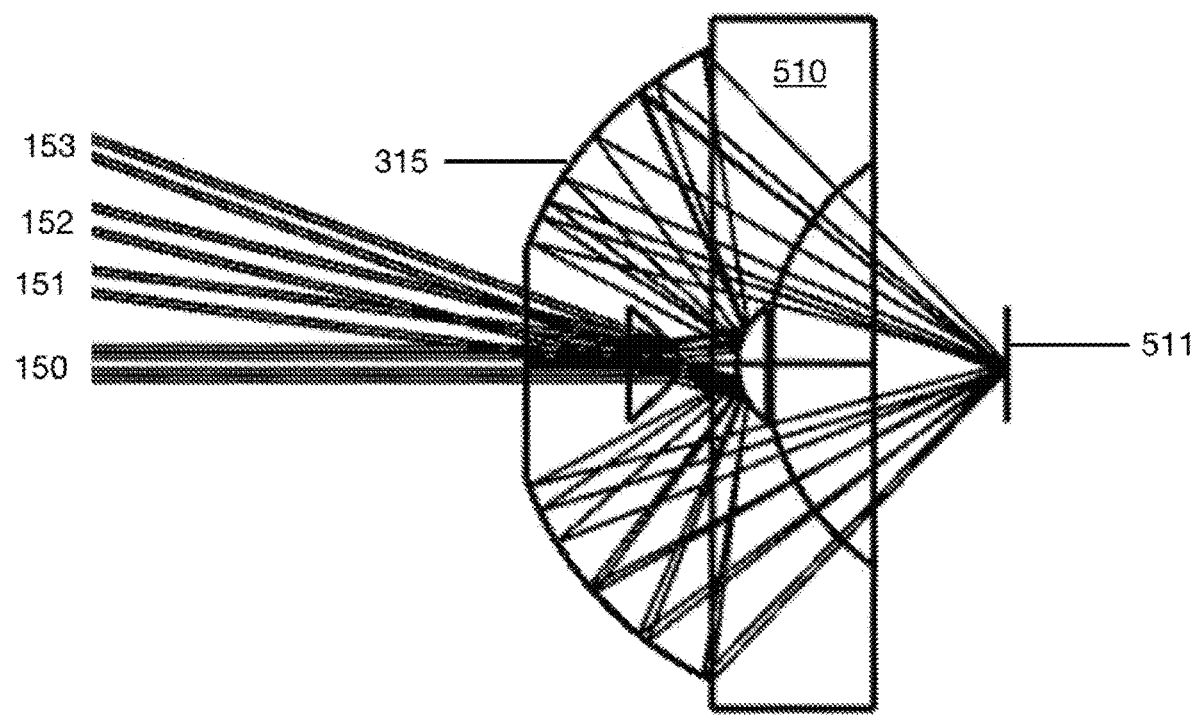
FIGS. 16 and 17 illustrate light from four different objects traveling through the focusing optical part of FIGS. 11-15 to the underlying camera sensor, in accordance with an embodiment of the present invention.
Figure 17:
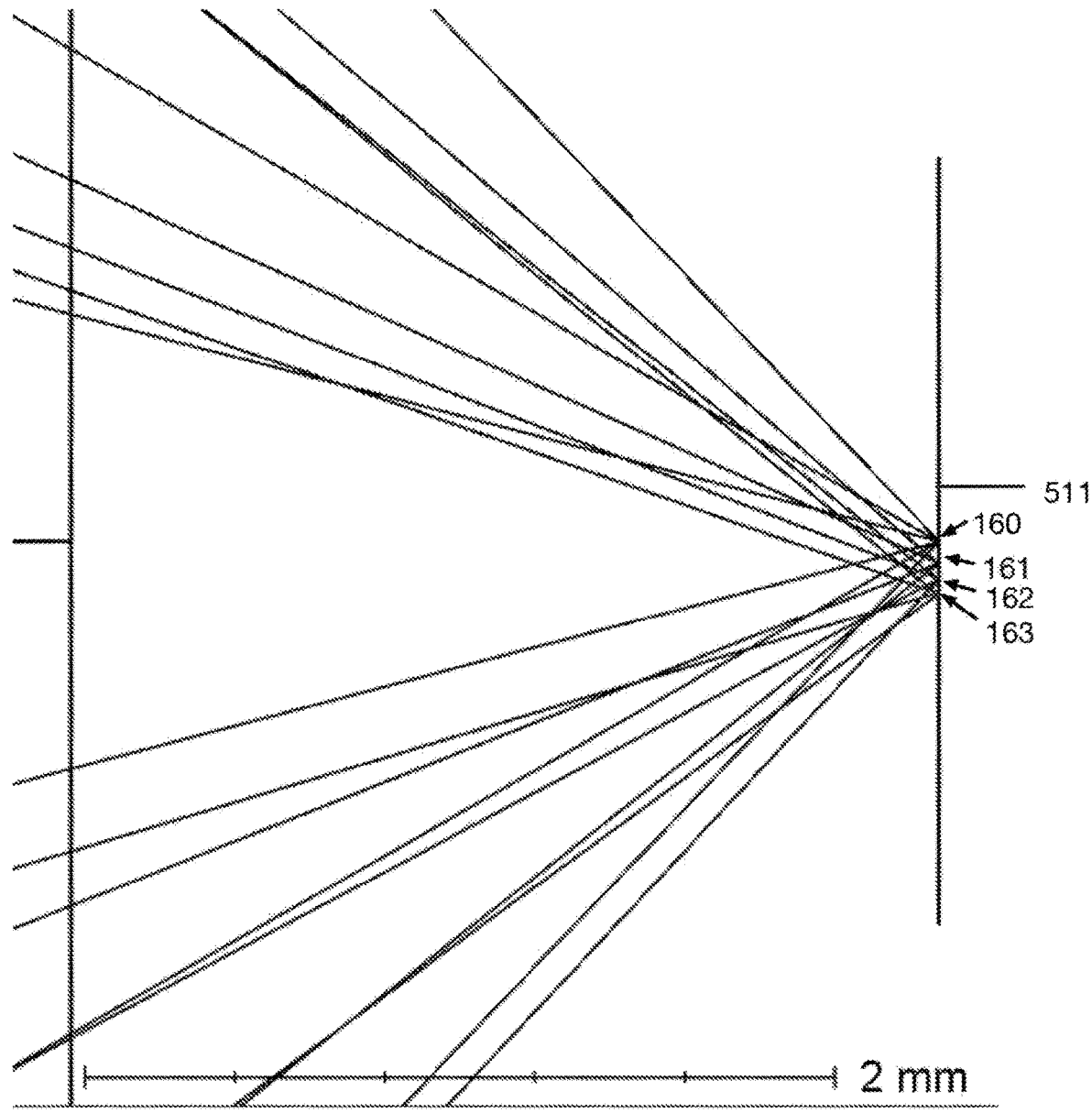

Reference is made to FIGS. 16 and 17, which illustrate light from four different objects traveling through the focusing optical part of FIGS. 11-15 to the underlying camera sensor, in accordance with an embodiment of the present invention. FIG. 16 shows light from four objects, 150-153, entering focusing optical part 510 through entry surface 312, reflected inside the optical part by mirrors 314 and 315, and exiting the part through exit surface 313 onto camera sensor 511. Mirrors 314 and 315 are a reflective objective.

FIG. 17 is an enlarged portion of FIG. 16 showing focused light exiting optical part 510 and arriving at camera sensor 511. FIG. 17 shows that the light from the four objects, 150-153, is directed onto respective focused locations 160-163 in camera sensor 511.

Focusing optical part 510 is designed to be used with a 0.3 mm×0.3 mm, 8×8 pixel, camera sensor 511. Thus, the sensor has 4×4 pixels in each quadrant. FIGS. 16 and 17 show that light from four different objects entering optical part 510 at slightly different angles is received as four distinct images on the sensor, each image being focused on a fine point 160-163 on the sensor. The light 150 from a first object directly opposite optical part 510 is focused on the center of sensor 511, which is at the center of the four central pixels in sensor 511. The light 151-153 from three other objects entering optical part 510 at different angles is focused on points 161-163, respectively, each point being at the center of a corresponding pixel in sensor 511. The angle between incoming light 150 and incoming light 153 is 20 degrees. This is the field of view of optical part 510 coupled with a 0.3 mm×0.3 mm sensor 511, as light entering the part at an angle greater than 20 degrees is directed to a location outside the 8×8 pixel sensor. When a larger sensor is used, the field of view is larger.

The light entering optical part 510 in FIG. 16 is illustrated as a hollow tube. This is because a portion of the incoming light is reflected, by mirror 314, back out of the optical part through entry surface 312. Thus, this portion of the light does not reach sensor 511. In order to minimize this light leakage, entry surface 312 is designed to refract the incoming light so that the light is spread across mirror 314 to minimize the amount of light reflected back out of the optical part and maximize throughput through the reflective objective. In some embodiments of the invention, entry surface 312 has a radius of at least 0.25 mm for easy manufacturing. Each incoming light object in FIG. 16 has a 0.3 mm radius, of which the central 0.1 mm radius is reflected back out of entry surface 312, and the remaining light reaches sensor 511. In order to calculate the f-number of optical part 510, the diameter of the entrance pupil is calculated according to the amount of light reaching sensor 511:

$$\text{F-number} = \text{focal\_length}/\text{diameter\_of\_entrance\_pupil}$$

$$\text{entrance pupil area} = \pi * 0.3^2 - \pi * 0.1^2$$

$$\text{entrance pupil radius} = 0.08^{1/2}$$

$$\text{entrance pupil diameter} = 2 * 0.08^{1/2} = 0.5657 \text{ mm}$$

The focal length of optical part 510 is 0.4 mm, and thus, the f-number is 0.707.

Exit surface 313 is designed to cause almost zero refraction to the focused light exiting optical part 510.

Some of the salient features of focusing optical part 510 are its low f-number (less than 1; even less than 0.8), which is much lower than any comparable refractive lens, and its wide field of view)(+−20°) that requires a very short focal length, particularly when the image height is short (0.15 mm—half the width of sensor 511).

Figure 18:
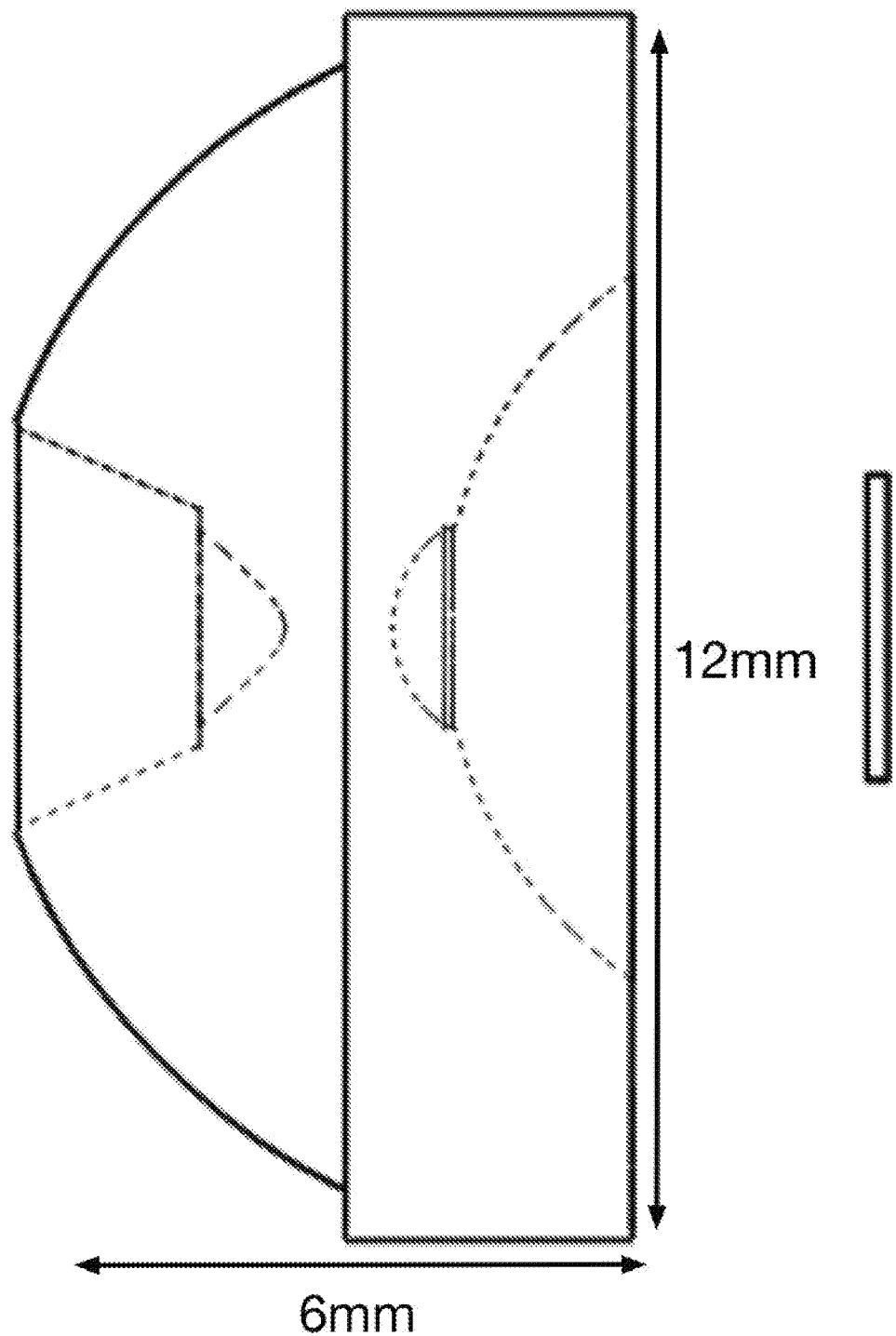
FIG. 18 is an illustration of the dimensions of the focusing optical part of FIGS. 11-15, in accordance with an embodiment of the present invention.

Reference is made to FIG. 18, which is an illustration of the dimensions of the focusing optical part of FIGS. 11-15, in accordance with an embodiment of the present invention. FIG. 18 shows the dimensions of focusing optical part 510, namely, 12 mm in diameter and 6 mm high.

As explained hereinabove, camera sensor 511 mounted beneath focusing optical part 510 is used to identify the polar angle and azimuth angle in 3D space at which light from the object enters optical part 510. In order to identify the location in 3D space at which the object is located, two units, each including a camera sensor 511 and a focusing optical part 510, are used and the polar and azimuth angles reported by the two units are triangulated. Additional units can be added, as discussed below, to add precision and to cover additional areas. In some embodiments of the invention, camera sensor 511 is a time-of-flight camera and a light emitter is added to the system, whereby the camera reports the time of flight from activation of the emitter until the light is detected at sensor 511. This information indicates the radial distance of the object from the sensor. Thus, a single unit is operable to identify the location of the object in 3D space using spherical coordinates, namely, the object's polar angle, azimuth angle and radial distance. In such embodiments too, additional units can be added, as discussed below, to add precision and to cover additional areas.

Figure 19:
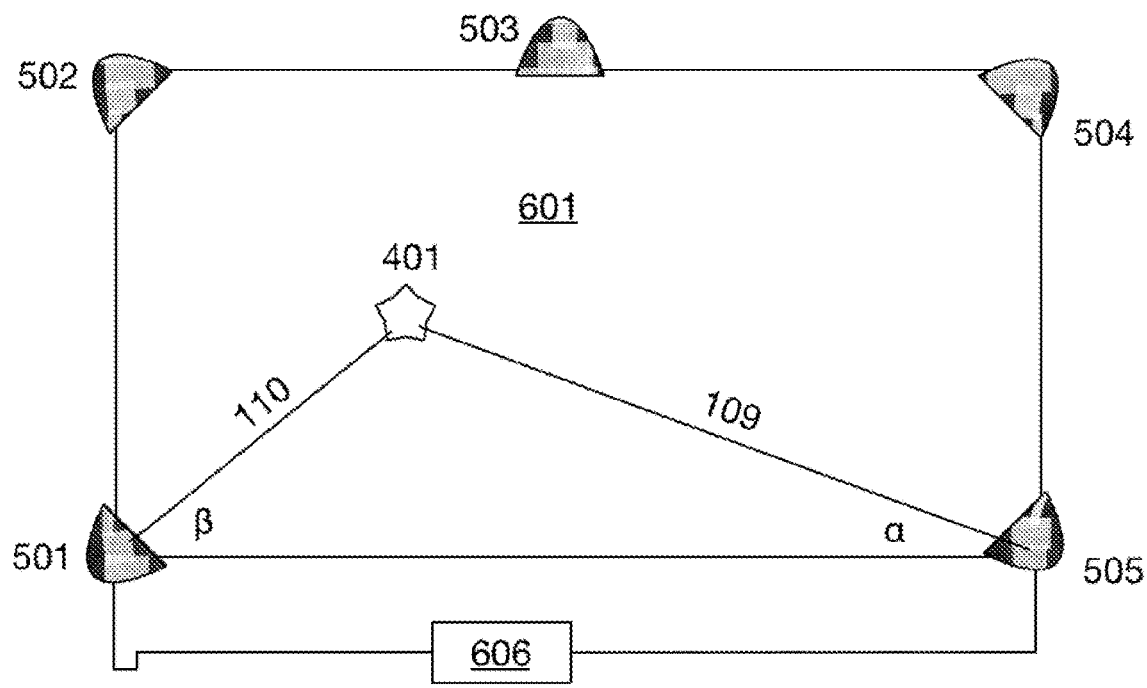
FIGS. 19-24 are illustrations of multiple sensors arranged along the perimeter of a detection zone, in accordance with embodiments of the present invention.

Reference is made to FIGS. 19-24, which are illustrations of multiple sensors arranged along the perimeter of a detection zone, in accordance with embodiments of the present invention. FIG. 19 shows touch screen display 601 equipped with a triangulating sensor that includes five polar coordinate sensors 501-505. In some embodiments of the invention, sensors 501-505 include focusing optical part 510 coupled with a camera sensor 511, with or without the time-of-flight feature, discussed hereinabove with respect to FIGS. 4-10. In other embodiments of the invention sensors 501-505 include lens structure 301 and array 206 of PDs, discussed hereinabove. Object 401 is shown detected by polar coordinate sensors 501 and 505, which is sufficient to triangulate the object's location using detected angles α and β when these angles are large and sensitive to small movements of the object.

Figure 20:
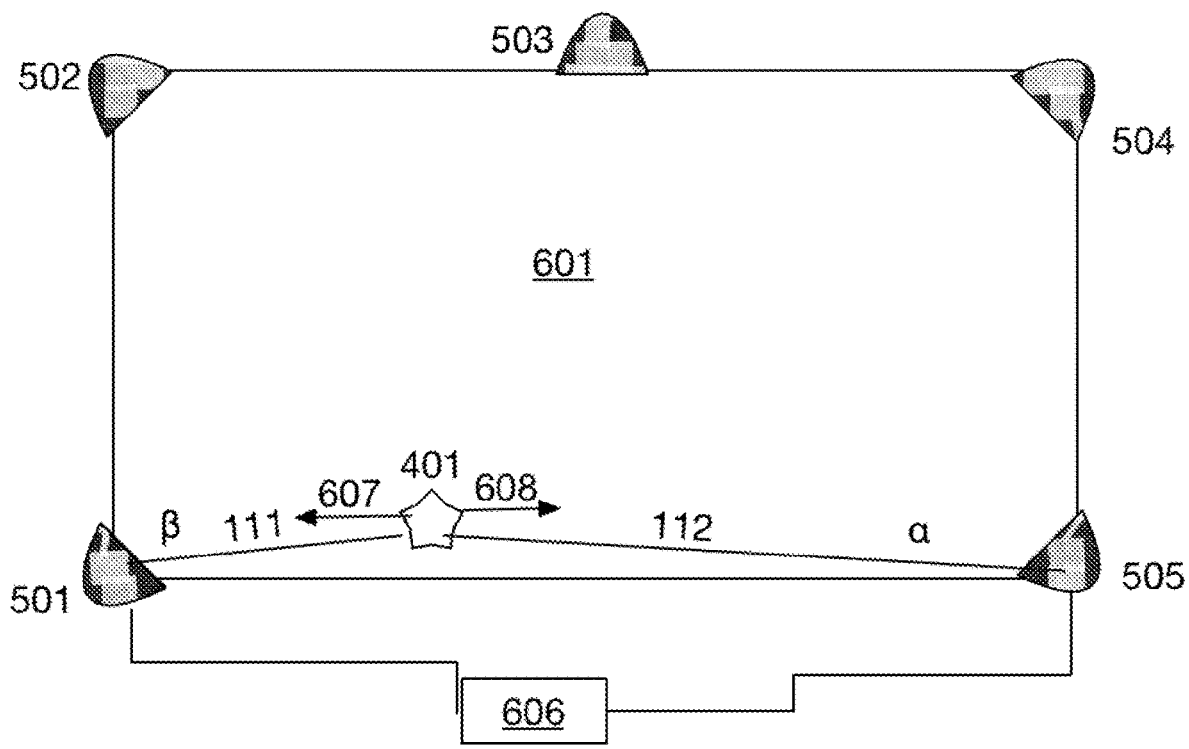

FIG. 20 shows that the area along the bottom edge of display 601 is difficult to accurately triangulate because different locations along this edge result in only minimal changes in the reflection angles detected by polar coordinate sensors 501 and 505. I.e., moving object 401 in the directions indicated by arrows 607 and 608 will cause only minimal changes in angles α and β. Moreover, in this region it is difficult to track more than one object because when two objects are in this region each polar coordinate sensor only detects reflections of the closer object; reflections from the distant object are blocked by the closer object.

Figure 21:
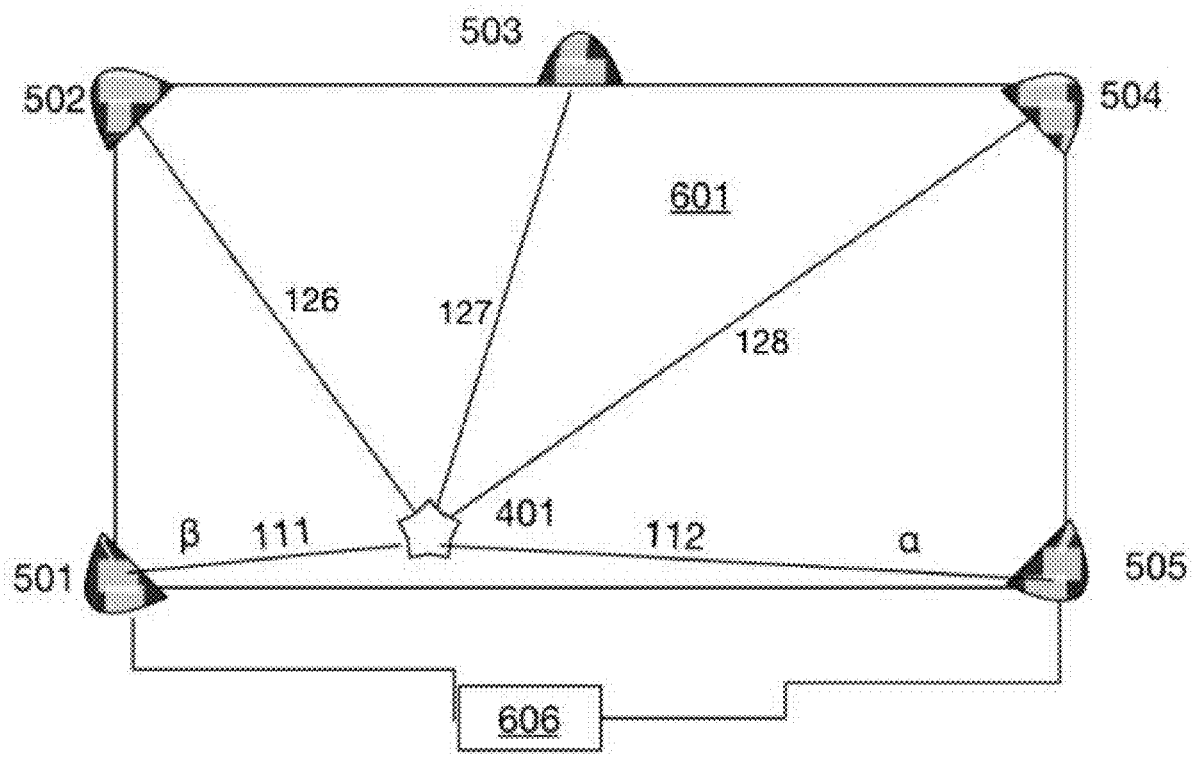

One approach to resolving the problem illustrated by object 401 in FIG. 20 is to provide additional polar coordinate sensors around display 601 such that any movement on the display will cause a significant change in detection angle for at least some of the polar coordinate sensors, and even when multiple objects are present, each object will always be detected by at least two of the sensors. FIG. 21 shows reflections 111, 112. 126-128 of object 401 detected by five polar coordinate sensors 501-505 that surround display 601 enabling the object's position to be triangulated accurately by calculating unit 606.

Figure 22:
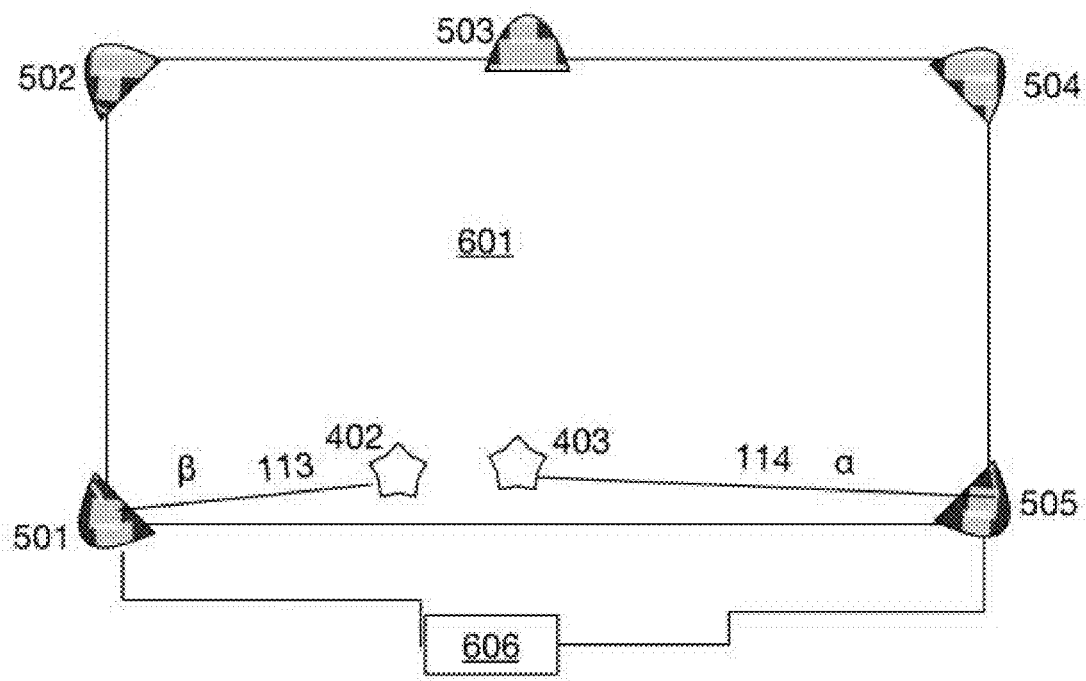

FIG. 22 shows the problem when two objects 402, 403 are situated along, or near, a line connecting two polar coordinate sensors, 501, 505. namely, that each sensor only detects reflections of the closer object; reflections 113, 114 from the distant object are blocked by the closer object.

Figure 23:
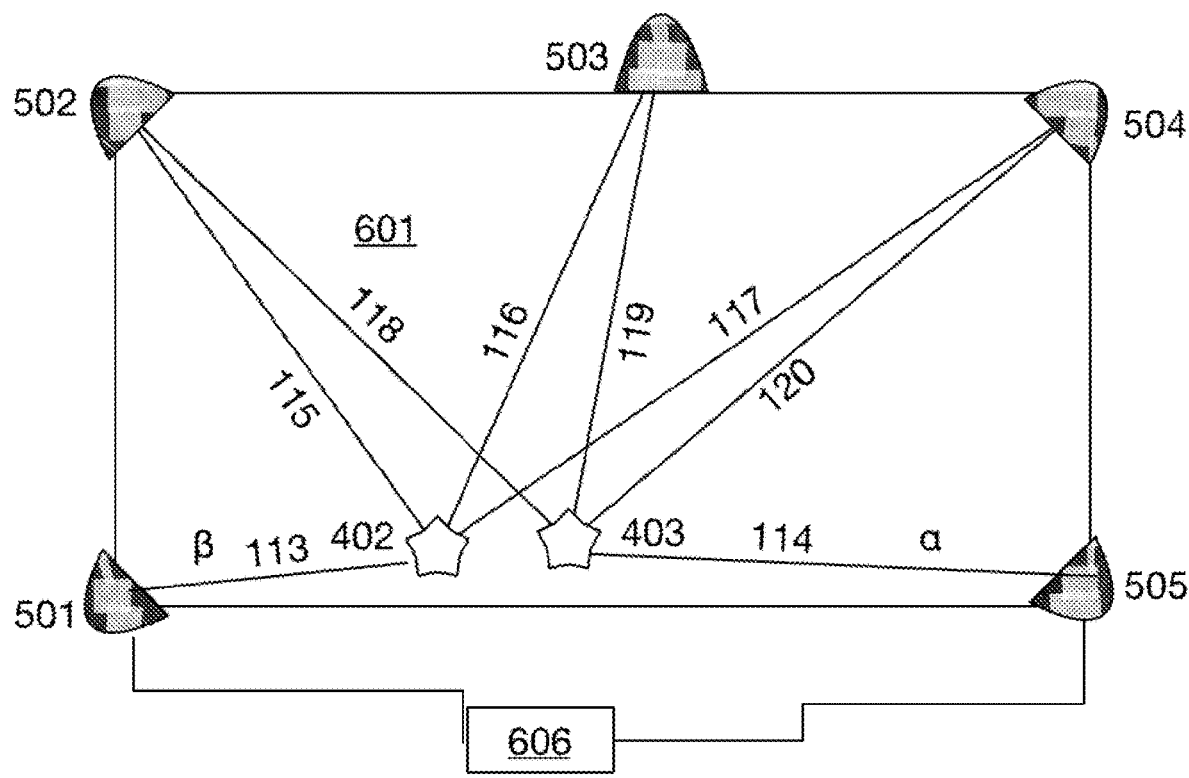

FIG. 23 shows how the solution of providing additional polar coordinate sensors around display 601 resolves the issue illustrated by FIG. 22, as different reflections 113-120 of each object are detected by the five polar coordinate sensors 501-505 that surround display 601 and thereby enable multi-touch detection for objects 402 and 403 of FIG. 23.

Another approach to resolving the location of object 401 in FIG. 20 is to use the cumulative intensity of the reflections detected at each polar coordinate sensor in addition to the angle, in order to determine an object's position. Specifically, the intensity of the detected reflection changes according to the distance between object 401 and each polar coordinate sensor. Thus, movement along the bottom edge of display 601 is tracked by calculating unit 606 comparing the intensities of the detection by sensor 501 to the intensities of the detection by sensor 505, and also by analyzing each sensor's detections over time as the object moves, to determine if the object is moving toward that sensor or away from it. When the detections at the two sensors do not change at similar rates in opposite directions, it can be inferred that each sensor is detecting reflections from a different object and the movement of each object can be estimated based on the changing intensities of the detections at one of the sensor components over time. The intensity of the detection used is the cumulative output of the entire PD array or camera sensor in each polar coordinate sensor.

Yet another approach to resolving the ambiguities discussed in relation to FIGS. 20 and 22 is to determine time of flight for detected reflections in each of the polar coordinate sensors. Using time of flight, each sensor identifies not only the object's polar angle, but also is its radial distance from the sensor. This enables clearly identifying movement even along the bottom of display 601 in the directions indicated by arrows 607, 608 in FIG. 20, and also enables differentiating the locations of the different objects 402, 403 illustrated in FIG. 22, as each sensor detects the radial distance of the object nearest to it.

The examples of FIGS. 21 and 23 also serve to illustrate how the present invention provides a scalable solution. Thus, adding additional polar or spherical coordinate sensors around a detection zone increases the resolution of detection. Conversely, cost can be reduced by providing fewer sensors and thereby reducing resolution. Also, the same polar or spherical coordinate sensor hardware is used for different size screens.

Figure 24:
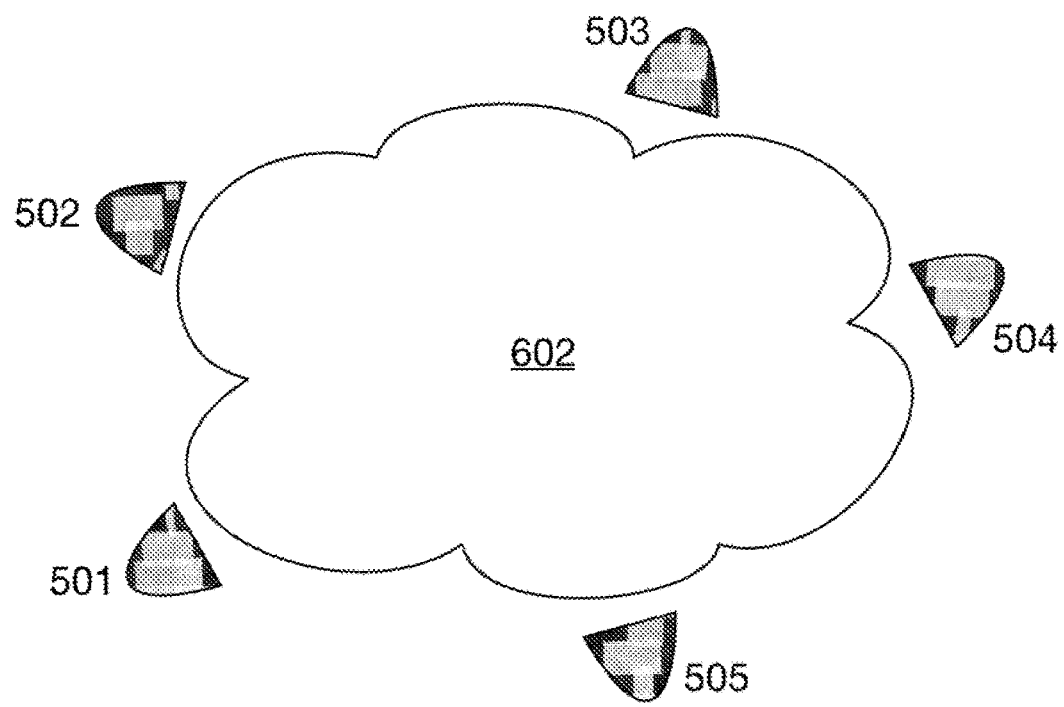

FIG. 24 shows further how versatile the polar and spherical coordinate sensors of the present invention are. FIG. 24 shows a gesture interaction space 602 that is a complex shape. Nonetheless, the polar or spherical coordinate sensors 501-505 placed along the perimeter of interaction space 602 provide touch and gesture detection for that space.

Figure 25:
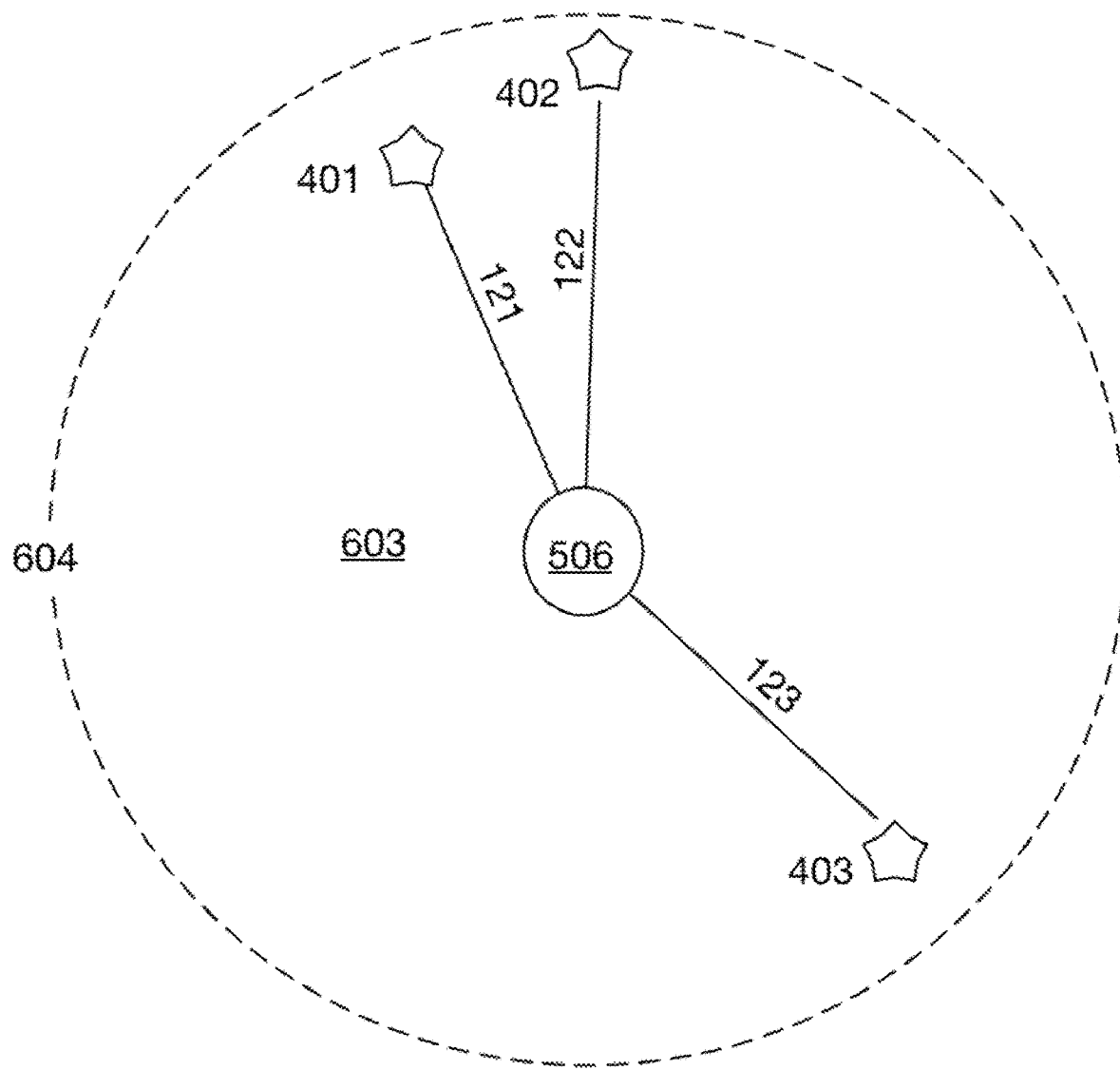
FIG. 25 is an illustration of a sensor at the center of a detection zone, in accordance with an embodiment of the present invention.

Reference is made to FIG. 25, which is an illustration of a sensor at the center of a detection zone, in accordance with an embodiment of the present invention. FIG. 25 shows embodiments of the polar and spherical sensors whose detection zone surrounds the sensor. In the embodiments of FIG. 25 sensor 506 is configured to detect polar angles of reflections arriving from anywhere around the sensor, within detection zone 603 that ends at border 604. FIG. 25 illustrates three objects 401-403 detected by reflections 121-123, respectively. This sensor has several embodiments and applications.

In one embodiment, sensor 506 detects only the polar angle of a detected reflection. Nonetheless, it is used alone to detect radial movements in detection zone 603, e.g., to report clockwise and counter clockwise gestures. For such applications, it is not necessary that the sensor identify the radial distance of a detected object, only its clockwise or counterclockwise movement. One example for such an application is the iPod® click wheel used to navigate several iPod models. IPOD is a trademark of Apple Inc. registered in the United States and other countries.

In a second embodiment, sensor 506 provides time of flight detection and is therefore operable to determine both polar angle and radial distance of a reflective object.

In a third embodiment, multiple sensors are placed at different locations such that their detection zones 603 partially overlap, whereby objects detected by more than one sensor are triangulated.

Figure 26:
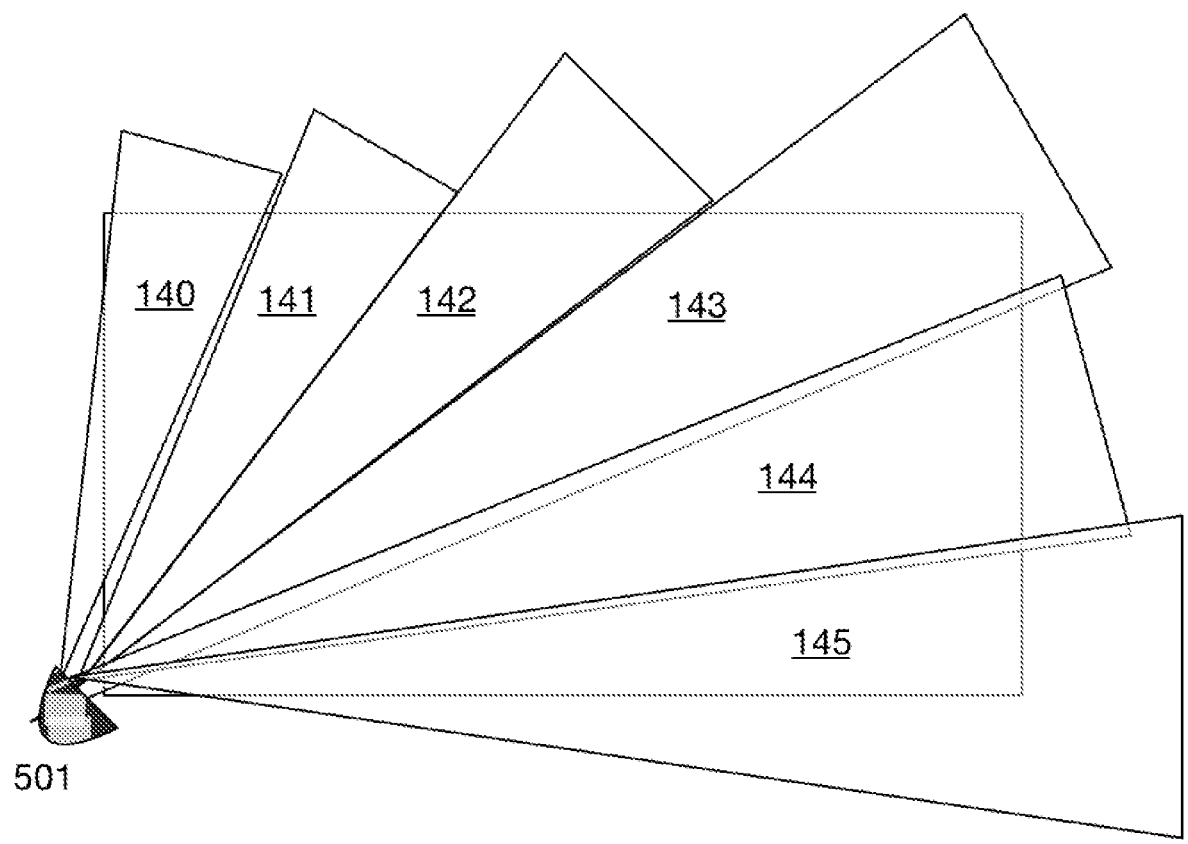
FIGS. 26 and 27 are illustrations of sensor illumination schemes, in accordance with embodiments of the present invention.
Figure 27:
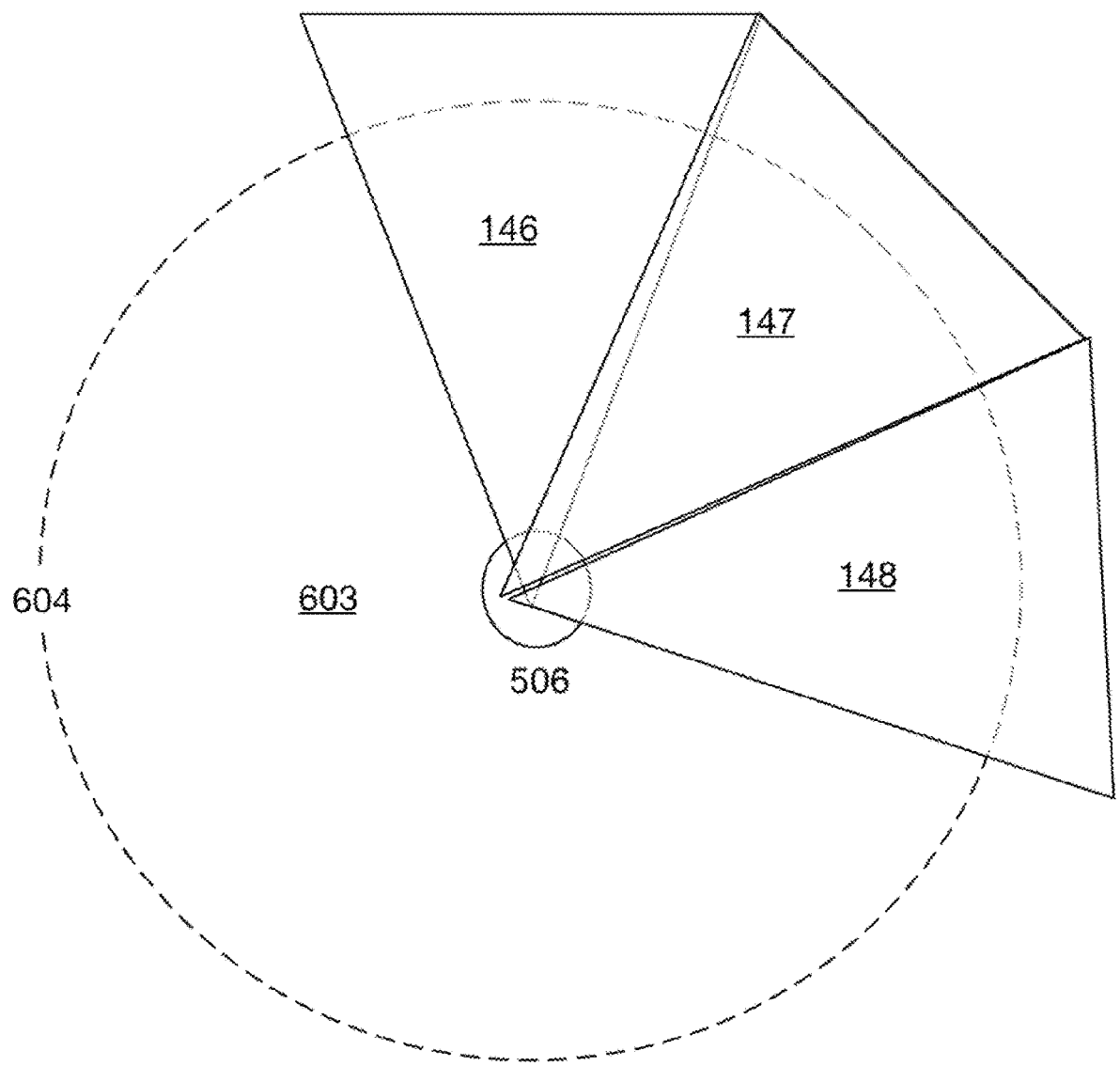

As discussed hereinabove, an illuminator, inter alia one or more LEDs, VCSELs or lasers, is provided for each polar coordinate sensor and spherical coordinate sensor to create detected reflections. Reference is made to FIGS. 26 and 27, which are illustrations of sensor illumination schemes, in accordance with embodiments of the present invention. FIG. 26 shows an illuminator configuration in which different illuminators illuminate 140-145 different areas of a display or detection zone for a directional sensor, and FIG. 27 shows an illuminator configuration for a sensor at the center of a detection zone. The illumination schemes of FIGS. 26 and 27 enable illuminating only those parts of the detection zone in which the object is likely to be located. For example, when a moving object's direction and velocity have been detected, it is possible to assume where within the detection zone it is highly unlikely for the object to be located in the near future. Furthermore, when a reflection arrives at the sensor component from part of the detection zone in which the object is not likely to be located, that reflection can be ignored as noise or treated as a different object.

The sensor components according to the present invention are suitable for numerous applications beyond touch screens and touch control panels, inter alia, for various environmental mapping applications. One application in semi-autonomous vehicles is identifying whether the person in the driver's seat has his feet placed near the gas and brake pedals so as to quickly resume driving the vehicle if required. Additional sensor components are also placed around the driver to identify head orientation and hand and arm positions to determine whether the driver is alert, facing the road and prepared to take control of the vehicle. In some embodiments, the spherical coordinate sensor featuring focusing optical part 510 and a camera sensor is used to map the body of a vehicle occupant and identify the occupant's behavior, e.g., to determine if a driver is prepared to take over control of a semi-autonomous vehicle. Yet another use for this sensor is to mount it in the rear of a vehicle cabin to detect a baby left in the back seat of a parked car and alert the person leaving the car. Yet another use for this sensor is to mount it in the cargo section of a vehicle, such as a car trunk or an enclosed cargo space in a truck, to determine if a person is inside that section and avoid locking that section with the person inside.

In some embodiments of the invention, image processing of a camera image of the occupant is combined with the proximity sensor information to precisely locate a vehicle occupant's limbs and track their movements. In some cases, the image is taken from the same camera used to obtain the polar coordinates based on reflections.

Another application is car door collision detection, whereby polar or spherical coordinate sensors are mounted along the bottom edge of a car door facing outward to detect if the door will scrape the curb, hit a tree or stone, or scratch a neighboring parked car as the door opens. In some embodiments, a sensor is mounted such that its detection zone extends between the car and the car door when the door is open, enabling the sensor to detect if a finger or clothing will be caught when the door closes.

In yet another application, polar or spherical coordinate sensors are mounted facing outward of a moving vehicle, inter alia, cars, trucks and drones, and generate a proximity map surrounding the vehicle as it moves, like a scanner passing across a document.

In yet another application, a polar or spherical coordinate sensor is mounted on the top or bottom of a done propeller to detect approaching obstacles and prevent drone collision.

In the foregoing specification, the invention has been described with reference to specific exemplary embodiments thereof. It will, however, be evident that various modifications and changes may be made to the specific exemplary embodiments without departing from the broader spirit and scope of the invention. Accordingly, the specification and drawings are to be regarded in an illustrative rather than a restrictive sense.

The invention claimed is:

1. A focusing optical part, comprising a plastic body, suitable for being delivered on a tape and reel and mounted on a PCB by an automated mounting machine, the plastic body comprising:
   a concave mirror comprising a center aperture input surface through which light enters said plastic body;
   a convex mirror opposite the center aperture, wherein said concave mirror and the convex mirror form a reflective objective that reflects and focuses the light inside said plastic body; and
   a concave exit surface surrounding said convex mirror, through which focused light exits said plastic body, wherein said exit surface is formed to minimize refraction of the focused light.

2. The focusing optical part of claim 1, wherein a portion of the light that enters the focusing optical part is reflected by said convex mirror out of the focusing optical part through said center aperture input surface, and wherein said center aperture input surface is concave and formed to refract incoming light in a manner that minimizes the amount of light that exits through said center aperture input surface.

3. The focusing optical part of claim 1, having an f-number less than 1.

4. The focusing optical part of claim 1, having an f-number less than 0.8.

5. The focusing optical part of claim 1, having a field of view of +/−20 degrees.

6. A spherical coordinate sensor comprising:
   a circuit board;
   at least one light emitter mounted on said circuit board, each light emitter operable when activated to project light across a detection zone;
   a focusing optical part mounted on said circuit board and receiving light from the detection zone, comprising;
      a concave mirror comprising a center aperture input surface through which light enters the focusing optical part;
      a convex mirror opposite the center aperture, wherein said concave mirror and the convex mirror form a reflective objective that reflects and focuses the light inside the focusing optical part; and
      an exit surface surrounding said convex mirror, through which focused light exits the focusing optical part;
   a camera comprising a plurality of pixel sensors, mounted on said circuit board beneath said focusing optical part such that when the received light enters said focusing optical part at a three-dimensional angle of incidence, comprising a polar angle and an azimuth angle, denoted $(\theta_i, \varphi_j)$, more light arrives at a respective camera pixel sensor than at any of the other camera pixel sensors; and
   a processor connected to said at least one light emitter and to said camera, the processor being configured to determine a polar angle, $\theta$, and an azimuth angle, $\varphi$, of a reflective object within the detection zone relative to said focusing optical part, based on the camera pixel sensor that detects the greatest amount of the object's reflection.

7. The spherical coordinate sensor of claim 6, wherein said processor is configured to determine the angles $\theta, \varphi$ of the reflective object within the detection zone relative to said focusing optical part, by interpolating the outputs of a neighborhood of the camera pixel sensors that detects the greatest amount of the object's reflection.

8. The spherical coordinate sensor of claim 6, wherein said processor:
- measures elapsed time of flight for photons reflected by the object and detected by said camera,
- calculates a distance between said camera and the object based on the measured time, and
- determines a location of the reflective object within the detection zone based on the angles θ, φ and the calculated distance.

9. Use of the spherical coordinate sensor according to claim 6 to detect movement inside a vehicle, comprising mounting the spherical coordinate sensor in the vehicle in a manner that an occupant of the vehicle is at least partially inside the spherical coordinate sensor detection zone.

10. The spherical coordinate sensor of claim 6, wherein said focusing optical part comprises a plastic body and is suitable for being delivered on a tape and reel and mounted on a PCB by an automated mounting machine.

11. The spherical coordinate sensor of claim 6, wherein said focusing optical part exit surface is concave and formed to minimize refraction of the focused light.

12. The spherical coordinate sensor of claim 6, wherein a portion of the light that enters said focusing optical part is reflected by said convex mirror out of said focusing optical part through said center aperture input surface, and wherein said center aperture input surface is concave and formed to refract incoming light in a manner that minimizes the amount of light that exits through said center aperture input surface.

13. The spherical coordinate sensor of claim 6, wherein said focusing optical part has an f-number less than 0.8.

14. The spherical coordinate sensor of claim 6, wherein said focusing optical part has a field of view of +/−20 degrees.

15. Use of the spherical coordinate sensor according to claim 6 in a vehicle cabin to detect an orientation of the vehicle driver's head, comprising mounting the spherical coordinate sensor in the vehicle in a manner such that the vehicle driver's head is inside the spherical coordinate sensor detection zone.

16. Use of the spherical coordinate sensor according to claim 6 in a vehicle cabin to detect positions of the vehicle driver's hand and arm, comprising mounting the sperical coordinate sensor in the vehicle in a manner such that the vehicle driver's hand and arm are inside the sperical coordinate sensor detection zone.

17. Use of the spherical coordinate sensor according to claim 6 in a vehicle cabin to detect where the vehicle driver's feet are placed, comprising mounting the spherical coordinate sensor in the vehicle in a manner such that the vehicle driver's feet are inside the spherical coordinate sensor detection zone.

18. Use of the spherical coordinate sensor according to claim 6 in a vehicle cabin to detect a baby in the rear portion of the vehicle cabin, comprising mounting the sperical coordinate sensor in the vehicle in a manner such that the rear portion of the vehicle cabin is inside the spherical coordinate sensor detection zone.

19. Use of the spherical coordinate sensor according to claim 6 in a vehicle door to detect imminent collisions between the door and objects outside the vehicle, comprising mounting the spherical coordinate sensor in the vehicle door in a manner such that the spherical coordinate sensor detection zone includes all objects outside the vehicle located such that the door would collide with the objects if the door is opened.

* * * * *